(12) United States Patent
Wu

(10) Patent No.: US 11,131,811 B2
(45) Date of Patent: Sep. 28, 2021

(54) FIBER OPTIC CABLE ASSEMBLY WITH THERMOPLASTICALLY OVERCOATED FUSION SPLICE, AND RELATED METHOD AND APPARATUS

(71) Applicant: CORNING RESEARCH & DEVELOPMENT CORPORATION, Corning, NY (US)

(72) Inventor: Qi Wu, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/573,116

(22) Filed: Sep. 17, 2019

(65) Prior Publication Data

US 2020/0012047 A1 Jan. 9, 2020

Related U.S. Application Data

(63) Continuation of application No. PCT/US2018/012685, filed on Mar. 9, 2018.

(Continued)

(51) Int. Cl.
*G02B 6/255* (2006.01)
(52) U.S. Cl.
CPC .................. *G02B 6/2558* (2013.01)
(58) Field of Classification Search
CPC .... G02B 6/255; G02B 6/2558; G02B 6/4454; G02B 6/2856
See application file for complete search history.

(56) References Cited

U.S. PATENT DOCUMENTS

| 4,018,983 A | 4/1977 | Pedlow |
| 4,077,702 A | 3/1978 | Kunze et al. |

(Continued)

FOREIGN PATENT DOCUMENTS

| CN | 1548492 A | 11/2004 |
| CN | 1735825 A | 2/2006 |

(Continued)

OTHER PUBLICATIONS

Duke et al; "Benefits of CO2 Laser Heating for High Reliability Fiber Splicing," Proc. SPIE 9735, pp. B1-B12, 2016.

(Continued)

*Primary Examiner* — Jennifer Doan
(74) *Attorney, Agent, or Firm* — Kapil U. Banakar

(57) ABSTRACT

A method for protecting fusion spliced optical fibers includes immersing sections of fusion spliced first and second optical fibers in a pool of molten thermoplastic material, followed by removal and cooling of liquid-coated areas, to yield a solid thermoplastic overcoating that extends over a splice joint as well as previously stripped sections and pre-coated sections of the first and second optical fibers. Optionally, a strength member may be adhered to the solid thermoplastic overcoating to provide a reinforced fusion spliced section. A strength member may include a metal rod or a secondary, thick thermoplastic coating. A fiber optic cable assembly includes a solid thermoplastic overcoating that extends over the splice joint as well as previously stripped sections and pre-coated sections of the fibers. Such coating may be formed rapidly with minimal capital expense, may dispense with the need for integrated strength members, and may provide reduced size and enhanced flexibility as compared to heat shrink protection sleeves.

23 Claims, 25 Drawing Sheets

Related U.S. Application Data

(60) Provisional application No. 62/592,578, filed on Nov. 30, 2017, provisional application No. 62/592,564, filed on Nov. 30, 2017, provisional application No. 62/483,993, filed on Apr. 11, 2017, provisional application No. 62/474,304, filed on Mar. 21, 2017.

(56) References Cited

U.S. PATENT DOCUMENTS

| | | | |
|---|---|---|---|
| 4,254,865 | A | 3/1981 | Pacey et al. |
| 4,509,820 | A | 4/1985 | Murata et al. |
| 4,537,468 | A | 8/1985 | Degoix et al. |
| 4,714,316 | A | 12/1987 | Moore et al. |
| 4,778,242 | A | 10/1988 | Ota et al. |
| 4,786,138 | A | 11/1988 | Buckley |
| 4,812,010 | A | 3/1989 | Osaka et al. |
| 4,865,411 | A | 9/1989 | Darsey et al. |
| 4,878,732 | A | 11/1989 | Rohner et al. |
| 4,923,274 | A | 5/1990 | Dean |
| 5,022,735 | A | 6/1991 | Dahlgren |
| 5,093,048 | A | 3/1992 | Kagan |
| 5,212,756 | A | 5/1993 | Eoll |
| 5,231,688 | A | 7/1993 | Zimmer |
| 5,247,598 | A | 9/1993 | Takimoto et al. |
| 5,367,591 | A | 11/1994 | Seike et al. |
| 5,416,873 | A | 5/1995 | Huebscher et al. |
| 5,477,507 | A | 12/1995 | Kaplan |
| 5,682,454 | A | 10/1997 | Gaillard |
| 5,720,908 | A | 2/1998 | Gaillard |
| 5,731,051 | A | 3/1998 | Fahey et al. |
| 5,832,162 | A | 11/1998 | Sarbell |
| 6,099,170 | A | 8/2000 | Sarbell |
| 6,152,611 | A | 11/2000 | Mardirossian |
| 6,282,353 | B1 | 8/2001 | Clark |
| 6,295,400 | B1 | 9/2001 | Shahid |
| 6,360,044 | B1 | 3/2002 | Mills et al. |
| 6,367,990 | B1 | 4/2002 | Dumitriu |
| 6,421,493 | B1 | 7/2002 | Burek et al. |
| 6,454,471 | B1 | 9/2002 | Ware et al. |
| 6,485,199 | B1 | 11/2002 | Ware et al. |
| 6,614,971 | B2 | 9/2003 | Sun et al. |
| 6,676,299 | B1 | 1/2004 | Durrant et al. |
| 6,738,555 | B1 | 5/2004 | Cooke et al. |
| 6,742,705 | B1 | 6/2004 | Clark |
| 6,771,961 | B2 | 8/2004 | Bamburak et al. |
| 7,364,375 | B1 | 4/2008 | Jones |
| 7,461,981 | B2 | 12/2008 | Yow, Jr. et al. |
| 7,901,147 | B1 | 3/2011 | De et al. |
| 8,047,726 | B2 | 11/2011 | Tamekuni et al. |
| 8,096,712 | B2 | 1/2012 | Solomon et al. |
| 8,388,242 | B2 | 3/2013 | Kachmar et al. |
| 8,408,811 | B2 | 4/2013 | de Jong et al. |
| 8,408,818 | B2 | 4/2013 | Homma |
| 8,548,294 | B2 | 10/2013 | Toge et al. |
| 8,573,855 | B2 | 11/2013 | Nhep |
| 8,696,221 | B2 * | 4/2014 | Vastmans ............ G02B 6/2558 385/99 |
| 8,702,326 | B2 | 4/2014 | Faulkner et al. |
| 8,740,479 | B2 | 6/2014 | Shitama et al. |
| 8,824,841 | B1 | 9/2014 | Mullen |
| 8,915,659 | B2 | 12/2014 | Marcouiller et al. |
| 9,063,286 | B2 | 6/2015 | Durrant et al. |
| 9,089,931 | B1 | 7/2015 | Carberry et al. |
| 9,167,626 | B1 | 10/2015 | Wu |
| 9,360,624 | B2 | 6/2016 | Faulkner et al. |
| 9,389,382 | B2 | 7/2016 | Blazer et al. |
| 9,604,261 | B2 | 3/2017 | Wu |
| 9,857,548 | B2 | 1/2018 | Nielsen et al. |
| 9,939,599 | B2 | 4/2018 | Blazer et al. |
| 10,018,782 | B2 | 7/2018 | Wu |
| 10,185,110 | B2 | 1/2019 | Kaneko et al. |
| 10,209,447 | B2 * | 2/2019 | Filipowicz ........... G02B 6/2558 |
| 10,353,154 | B2 | 7/2019 | Ott et al. |
| 10,658,790 | B2 | 5/2020 | Finona |
| 2003/0016923 | A1 | 1/2003 | Summers et al. |
| 2003/0103743 | A1 | 6/2003 | Sun et al. |
| 2004/0062480 | A1 | 4/2004 | Cronk et al. |
| 2005/0238313 | A1 | 10/2005 | Clark |
| 2005/0271338 | A1 | 12/2005 | Livingston |
| 2006/0093281 | A1 | 5/2006 | Kesler |
| 2012/0243838 | A1 | 9/2012 | Sato et al. |
| 2012/0281951 | A1 | 11/2012 | Takahashi et al. |
| 2013/0302003 | A1 | 11/2013 | Bookbinder et al. |
| 2014/0321813 | A1 | 10/2014 | Lu |
| 2016/0299306 | A1 | 10/2016 | McAlpine et al. |
| 2016/0349453 | A1 | 12/2016 | Wu |
| 2017/0001224 | A1 | 1/2017 | Wu |
| 2017/0031121 | A1 | 2/2017 | Blazer et al. |
| 2018/0011262 | A1 | 1/2018 | Chabot et al. |
| 2018/0024294 | A1 | 1/2018 | Wang et al. |
| 2018/0210152 | A1 | 7/2018 | Giotto et al. |

FOREIGN PATENT DOCUMENTS

| | | |
|---|---|---|
| CN | 202494801 U | 10/2012 |
| DE | 202007013173 U1 | 1/2008 |
| EP | 0057828 A1 | 1/1982 |
| EP | 0278423 A2 | 8/1988 |
| EP | 0537413 A1 | 4/1993 |
| EP | 1168018 A2 | 1/2002 |
| JP | 55103513 A | 8/1980 |
| JP | 55129305 A | 10/1980 |
| JP | 58147707 A | 9/1983 |
| JP | 59037515 A | 3/1984 |
| JP | 62015504 A | 1/1987 |
| JP | 11326677 A | 11/1999 |
| JP | 2001147340 A | 5/2001 |
| JP | 2004347801 A | 12/2004 |
| JP | 2005250294 A | 9/2005 |
| JP | 2009163165 A | 7/2009 |
| JP | 2011232375 A | 11/2011 |
| JP | 5233859 B2 | 7/2013 |
| JP | 05233859 B2 | 7/2013 |
| WO | 2004/040347 A | 5/2004 |
| WO | 2009040271 A2 | 4/2009 |
| WO | 2011112764 A1 | 9/2011 |
| WO | 2013007969 A2 | 1/2013 |
| WO | 2013/126429 A2 | 8/2013 |
| WO | 2018/175122 A1 | 9/2018 |

OTHER PUBLICATIONS

Friebele et al; "Method for Recoating Optical Fibres With Polyimide," Electron. Lett, 34, pp. 1249-1250, 1998.

Glaesemann et al; "The Mechanical Reliability of Corning Optical Fiber in Small Bend Scenarios"; Corning; ISO 9001 Registered; (2007) 8 Pages.

International Search Report and Written Opinion of the International Searching Authority; PCT/US2018/021685; dated Aug. 6, 2018; 17 Pages; European Patent Office.

Invitation to Pay Additional Fees of the International Searching Authority; PCT/US2018/021685; dated May 30, 2018; 12 Pages; European Patent Office.

Matsumoto et al; "Design and Characteristics of Reinforcement Method for Fusion Spliced Optical Fiber," J. Lightwave Technol., LT-3, pp. 322-327, 1985.

Serafini.; "Compact and Reliable Protection of Single-Fiber and Ribbon-Fiber Fusion Splices" Proc. SPIE 1973, pp. 306-315 1993.

Trunk et al; "Protection With Heat-Shrinkable Sleeves for Optical Fiber Arc Fusion Splicing," Proc. SPIE 1365, Components for Fiber Optic Applications V, pp. 124-130, 1990.

Volotinen et al; "Effect of Mechanical Stripping and Arc-Fusion on the Strength and Aging of a Spliced Recoated Optical Fiber," Mat. Res. Soc. Symp. Proc. 531, pp. 163-168, 1998.

Wood, "Reliability of Optical Connectors and Splices", Proc. SPIE 2074, pp. 276-287, 1994.

Yablon, A.D.; "Optical Fiber Fusion Splicing," Springer, 2005; pp. 161-180.

Yamada et al; "Arc Usion Splicer With Profile Alignment System for High-Strength Low-Loss Optical Submarine Cable," J. Lightwave Technol., LT-4, pp. 1204-1210, 1986.

(56) References Cited

OTHER PUBLICATIONS

Wu; "Fiber Optic Cable Assembly With Thermoplastically Overcoated Fusion Splice" Filed as U.S. Appl. No. 62/592,564, filed Nov. 30, 2017; 78 Pages.

Wu; "Method and Apparatus for Protecting Fusion Spliced Optical Fibers With Thermoplastic Material" Filed as U.S. Appl. No. 62/592,578, filed Nov. 30, 2017; 81 Pages.

* cited by examiner

FIBER OPTIC CABLE ASSEMBLY WITH THERMOPLASTICALLY OVERCOATED FUSION SPLICE, AND RELATED METHOD AND APPARATUS

CROSS-REFERENCE TO RELATED APPLICATIONS

This application is a continuation of International Application No. PCT/US18/21685, filed on Mar. 9, 2018, which claims the benefit of priority to U.S. Application No. 62/592,578, filed on Nov. 30, 2017, U.S. Application No. 62/592,564, filed on Nov. 30, 2017, U.S. Application No. 62/483,993, filed on Apr. 11, 2017, and U.S. Application No. 62/474,304, filed on Mar. 21, 2017, the contents of which are relied upon and incorporated herein by reference in their entireties.

TECHNICAL FIELD

The disclosure relates generally to fiber optic cable assemblies incorporating fusion splices, and to methods and apparatuses for protecting fusion splices as well as fiber optic cable assemblies including protected fusion splices, in which the area of at least one fusion splice is structurally reinforced.

BACKGROUND

Optical fibers are useful in a wide variety of applications, including the telecommunications industry for voice, video, and data transmission. In a telecommunications system that uses optical fibers, there are typically many locations where fiber optic cables, which carry the optical fibers, connect to equipment or other fiber optic cables. Optical cables are frequency produced by extruding thermoplastic material (e.g., polyvinylchloride (PVC)) over at least one coated optical fiber.

Optical fiber fusion splicing is the process by which a permanent, low-loss, high-strength, fused (or welded) joint is formed between two optical fibers. The ultimate goal of optical fiber fusion splicing is to create a joint with no optical loss, yet with mechanical strength and long-term reliability that matches an unspliced continuous fiber. As compared to competing approaches for interconnecting optical fibers (e.g., connectorization, mechanical splicing, or free-space optical coupling), fusion splice joints are compact and may exhibit a cross-sectional area comparable to that of an unspliced optical fiber. Fusion splices are permanent in character, and may exhibit high mechanical strength, high alignment stability, and good tolerance to high temperatures and/or high optical power densities. Fusion splices also disallow entry of dust or contaminants into the optical path once fused.

Optical fiber fusion splicing is practiced in a variety of environments by diverse groups of professionals using a variety of splicing equipment. Three general categories of fusion splicing include: (1) field splicing, (2) factory (or OEM) splicing, and (3) laboratory splicing. Examples of field splicing include utilization of a commercial splicer to fusion splice optical cables in telecommunication networks, and the assembly of undersea fiber optic cables aboard fiber deployment ships. Examples of factory or OEM splicing include the assembly of optical amplifiers (e.g., erbium-doped fiber amplifiers (EDFAs)) and dispersion-compensating modules in a production environment. Laboratory splicing may be performed by researchers using specially designed or modified fusing splicing equipment.

FIG. 1 is a cross-sectional view of an exemplary coated optical fiber 10 that may be subject to fusion splicing. The coated optical fiber 10 includes a glass core 12, glass cladding 14 surrounding the glass core 12, and a multi-layer polymer coating 20 (including an inner primary coating layer 16 and an outer secondary coating layer 18) surrounding the glass cladding 14. The inner primary coating layer 16 may be configured to act as a shock absorber to minimize attenuation caused by any micro-bending of the coated optical fiber 10. The outer secondary coating layer 18 may be configured to protect the inner primary coating layer 16 against mechanical damage, and to act as a barrier to lateral forces. The outer diameter of the coated optical fiber 10 may be about 200 μm, about 250 μm, or any other suitable value. Optionally, an ink layer (e.g., having a thickness of about 5 μm) may be arranged over the secondary coating layer 18 of the coated optical fiber 10 to color the fiber (e.g., as is commonly used in ribbonized fibers), or a coloring agent may be mixed with the coating material that forms the secondary coating layer 18. An additional coating (not shown), which may be embodied in a tight buffer layer or a loose tube (also known as a furcation tube), may be applied to the coated fiber 10 to provide additional protection and allow for easier handling. Such optical fibers including this additional coating layer (e.g., buffered optical fibers or furcated optical fibers) typically have an outer diameter of about 900 μm.

Optical fiber fusion splicing typically includes multiple tasks. First, polymer coatings (e.g., coating layers 16, 18 shown in FIG. 1) of coated optical fibers (e.g., coated optical fiber 10 shown in FIG. 1) are stripped to expose glass cladding (e.g., glass cladding 14 shown in FIG. 1). Next, flat fiber end faces are formed, typically by cleaving exposed glass portions of the fibers. Then the fibers are laterally aligned to each other. The fiber tips must be heated to their softening point and pressed together to form a joint. Checks such as loss estimation and proof testing (to ensure long term mechanical reliability) may be performed. The completed splice must also be protected from the environment by packaging it.

Packaging for fusion splices shields fiber surfaces from mechanical degradation (e.g., abrasion) and chemical degradation (e.g., humidity) to ensure that splices exhibit long-term reliability. Optical fibers must typically be able to withstand service temperatures spanning at least a range of from −40° C. to 85° C. without suffering significant mechanical and/or optical performance degradation. A desirable fusion splice package should be relatively inexpensive, easy and quick to apply, resistant to thermal cycling, and compact in size. Moreover, a desirable fusion splice package should impart minimal geometric distortion to the splice, and should minimize mechanical loads (e.g., tensile, bending, or torsion loads) applied to the splice. Various splice protection strategies have been developed to address these concerns, segregated into two general categories: (1) splice protectors, which are typically rigid in character, and (2) recoats. Examples of conventional splice protectors include (i) heat shrink protection sleeves with integrated strength members (e.g., splints), and (ii) hard plastic (e.g., clam-shell type) cases, which serve to transfer mechanical loads across the splice joint. A recoat restores a flexible polymer coating onto a bare fusion splice, whereby the mechanical integrity of the splice depends on the fusion splice itself.

A heat shrink protection sleeve includes an outer heat shrink tube (typically made of a heat shrinkable material (e.g., a polyolefin) and/or a non-stick material (e.g., polytetrafluoroethylene (PTFE)), an inner thermoplastic tube typically made of a melt flow adhesive material (e.g., ethylene vinyl acetate (EVA)), and a stainless steel rod serving as the strength member or splint. When heated in an oven (e.g., associated with a fusion splicing tool), the thermoplastic tube melts and is compressed around the fiber and the stainless steel rod by the heat shrink tube, forming a hermetic seal around the fusion splice region.

FIG. 2 illustrates a first exemplary heat shrink protection sleeve 28 that includes an outer heat shrink tube 26 that contains an integrated steel strength member 24 (e.g., a stainless steel rod or splint) and an inner thermoplastic tube 22, with the coated optical fiber 10 of FIG. 1 arranged within the inner thermoplastic tube 22. The inner primary coating layer 16 and outer secondary coating layer 18 of the multi-layer polymer coating 20 are not illustrated in FIG. 2 to simplify the drawing. The outer heat shrink tube 26 and the inner thermoplastic tube 22 are shown in FIG. 2 in an "unshrunken" state (prior to application of heat thereto), with the inner thermoplastic tube 22 being loosely fitted around the optical fiber 10, and with the outer heat shrink tube 26 being loosely fitted around the stainless steel strength member 24 and the inner thermoplastic tube 22. It is to be appreciated that following application of sufficient heat, the inner thermoplastic tube 22 will soften and/or melt to more closely conform to the exterior of the optical fiber 10, and the outer heat shrink tube 26 will contract around the stainless steel strength member 24 and the inner thermoplastic tube 22. The purpose of the integrated strength member is to resist bending and enhance tensile strength, thereby enhancing reliability of a splice particularly when an optical fiber containing the splice needs to be coiled in a tight space (such as in module or cable assembly applications).

Another exemplary heat shrink protection sleeve 30 used to protect a splice joint 32 formed between two coated optical fibers 10A, 10B is schematically illustrated in FIGS. 3A and 3B. The heat shrink protection sleeve 30 includes a generally cylindrical inner tube 34 (e.g., a melt flow adhesive material such as ethylene vinyl acetate (EVA)) and a generally cylindrical outer tube 36 (e.g., a polyolefin and/or PTFE), wherein the outer tube 36 generally surrounds the inner tube 34, and the inner tube 34 defines an interior passage 40. The outer tube 36 is required for conventional heat shrink protection sleeves because the melt flow adhesive material (e.g., EVA) has a very high viscosity and a very low softening temperature (typically only about 100° C.). To ensure that the inner tube 34 wraps around the optical fibers 10A, 10B and the splice joint 30, the more temperature-resistant outer tube 36 is considered indispensable, particularly when the splice is intended for operation over a high temperature range of up to about 85° C.

In use, the heat shrink protection sleeve 30 is positioned over a fusion spliced section of two optical fibers 10A, 10B including a splice joint 32 arranged between (pre-stripped) glass cladding segments 14A, 14B of the respective optical fibers 10A, 10B. Upon application of heat (typically within an oven), the inner tube 34 melts around the optical fibers 10A, 10B, the glass cladding segments 14A, 14B, and the splice joint 32. The outer tube 36, which includes a cylindrical outer surface 38, may include some heat shrinking capability to help the adhesive distribute around the fused optical fibers 10A, 10B.

As the de facto splice protection technology in the fiber optics industry for decades, limitations of heat shrink protection sleeves are well known. Firstly, an operator must remember to thread (i.e., guide) an optical fiber through the heat shrink protection sleeve before fusion splicing is performed. A misstep in this process may require breaking and reworking the splice. Secondly, an optical fiber is subject to being threaded in the wrong place when the splice protector is small in diameter. If the optical fiber is in a cavity inside the outer tube but outside the inner tube (e.g., such as the inner and outer tubes 22, 26 of FIG. 2), the optical fiber will be in direct contact with the stainless steel strength member, which can weaken or break the fiber. Thirdly, curing the heat shrink protection sleeve can take at least 30 seconds, with such duration representing the longest and rate-limiting fraction of the time necessary to complete a single fusion splicing cycle. Fourthly, upon emerging from an oven, the heat shrink protection sleeve requires additional time to cool down, which further increases the time necessary to complete a fusion splicing cycle. Handling a heat shrink protected spliced fiber before it has sufficiently cooled also poses a potential safety concern. Additionally, fusion splices protected with heat shrink protection sleeves are bulky and inflexible, necessitating the use of a splice tray, module, or the like to manage the protection sleeves. This increases the cost and limits the size (i.e., miniaturization) of fiber optic components that contain fusion splices. Lastly, in cable assembly applications, a heat shrink protection sleeve requires excess jacket strip length, which requires an extra process step and extra material to protect the exposed cable after splicing.

Splice recoating is more costly and time-consuming to implement than using heat shrink protection sleeves to protect fusion splices. In a recoating process, a pre-stripped and spliced fiber section is placed in a mold with an inner diameter matching the fiber coating diameter. Typically, UV-sensitive polymer recoat material (e.g., acrylate-based material) is injected into the mold to surround the bare glass cladding of the spliced fibers, and UV light cures the polymer recoat material in place to yield a recoated optical fiber having the same cross-sectional dimension as that of the original coated fiber. As an alternative to UV curable recoating material, thermally curable polyimide material may be used for fiber splice recoating utilizing a similar mold. Fiber recoaters are manufactured by companies such as America Fujikura Ltd. (AFL) and Vytran (a division of Thorlabs, Inc.). While recoating provides benefits such as reduced size and increased flexibility relative to the use of heat shrink protection sleeves, use of recoating has been limited to high-end applications such as submarine fiber fusion splicing, mainly due to the capital cost of the re-coating equipment. Conventional recoating is also not practical for field deployment. Additional drawbacks of conventional recoating processes may include the handling of chemicals, limited shelf life, and complex process steps.

Heat shrink protection sleeves have also been applied to protect optical fiber ribbon splices, which include multiple fusion splices between first and second parallel arrays of optical fibers aligned side-by-side and contained in first and second optical fiber ribbon segments, respectively. In such a context, an integrated strength member typically includes a flat surface to support the fusion spliced fiber arrays, a thermoplastic inner tube is melted around the spliced ribbon cables and the integrated strength member, and a more temperature-resistant outer tube encases the thermoplastic inner tube. Other conventional methods for overcoating ribbon splices include placing a ribbon splice in a mold, and overmolding the splice with an adhesive material such as ultraviolet curable epoxy, such as disclosed in U.S. Pat. No. 9,360,624 assigned to Corning Optical Communications LLC. Both of the foregoing processes for protecting optical fiber ribbon splices are time-consuming to implement.

In view of the foregoing, need exists in the art for improved fiber optic cable assemblies suitable for protecting one or more fusion splices between complementary single-fiber or multi-fiber cables, as well as methods for protecting such fusion splices, to address limitations associated with conventional fiber optic cable assemblies and splice protection methods.

SUMMARY

Aspects of the present disclosure provide a fiber optic cable assembly with at least one thermoplastically overcoated splice joint, a method for protecting fusion spliced optical fibers, and an apparatus for applying a thermoplastic coating over fusion spliced optical fibers. In exemplary aspects, stripped sections and at least portions of pre-coated sections of fusion spliced optical fibers are immersed in a pool or bath of molten thermoplastic material, followed by removal and cooling of liquid-coated areas to yield a solid thermoplastic overcoating that extends over at least one splice joint as well as stripped sections and the at least portions of the pre-coated sections of the optical fibers. The optical fibers may include first and second fibers of a single-fiber cable assembly, or may include first and second pluralities of optical fibers for a multi-fiber cable assembly (e.g., a ribbon fiber cable assembly). The solid thermoplastic overcoating may be performed rapidly without need for conventional mold-type splice recoating equipment (thereby rendering it amenable to field deployment), and embodies reduced size and enhanced flexibility as compared to conventional heat shrink protection sleeves. Additional exemplary aspects relate to a fiber optic cable assembly that includes a solid thermoplastic overcoating that extends over at least one splice joint, stripped sections of optical fibers, and portions of pre-coated sections of the optical fibers. Still further exemplary aspects relate to an apparatus for applying a thermoplastic coating over fusion spliced optical fibers, the apparatus including at least one support surface supporting at least one pool of molten thermoplastic material, and a heating element configured to heat the at least one support surface to maintain the at least one pool of molten thermoplastic material in a molten state.

In one embodiment of the disclosure, a method for protecting fusion spliced first and second optical fibers is provided. The first and second optical fibers each include a stripped section and a pre-coated section, and a splice joint serves to join ends of the stripped sections of the first and second optical fibers. The method comprises immersing the splice joint, the stripped sections of the first and second optical fibers, and at least portions of the pre-coated sections of the first and second optical fibers in a pool of molten thermoplastic material to yield a liquid-coated segment of the first and second optical fibers. The method also comprises effecting removal of the liquid-coated segment from the pool of molten thermoplastic material and cooling the liquid-coated segment to yield a solid thermoplastic overcoating. The solid thermoplastic overcoating extends over the stripped sections of the first and second optical fibers, the splice joint, and the at least portions of the pre-coated sections of the first and second optical fibers.

In accordance with another embodiment of the disclosure, a method for protecting first and second pluralities of optical fibers is provided. Each optical fiber of the first and second pluralities of optical fibers includes a stripped section and a pre-coated section, and a plurality of splice joints joins ends of stripped sections of the first plurality of optical fibers and ends of stripped sections of the second plurality of optical fibers. The method comprises immersing the plurality of splice joints, the stripped sections of the fusion spliced first and second pluralities of optical fibers, and at least portions of the pre-coated sections of the fusion spliced first and second pluralities of optical fibers in a pool of molten thermoplastic material to yield liquid-coated segments of the fusion spliced first and second pluralities of optical fibers, while tension is applied between the first plurality of optical fibers and the second plurality of optical fibers. The method further comprises effecting removal of the liquid-coated segments from the pool of molten thermoplastic material and cooling the liquid-coated segments to yield a solid thermoplastic overcoating extending over the stripped sections of the fusion spliced first and second pluralities of optical fibers, the plurality of splice joints, and the at least portions of the pre-coated sections of the fusion spliced first and second pluralities of optical fibers.

In accordance with another embodiment of the disclosure, a fiber optic cable assembly is provided. The fiber optic cable assembly comprises first and second optical fibers each including a pre-coated section and a stripped section. The fiber optic cable assembly further comprises a fusion splice including a splice joint joining ends of the stripped sections of the first and second optical fibers. The fiber optic cable assembly additionally comprises a solid thermoplastic overcoating extending over the stripped section of each of the first and the second optical fibers, the splice joint, and a portion of the pre-coated section of each of the first and the second optical fibers.

In accordance with another embodiment of the disclosure, a fiber optic cable assembly including multiple substantially parallel optical fibers is provided. The term "substantially parallel" in this context refer to a state of largely extending in the same direction (e.g., without overlapping or diverging in a substantial way). The fiber optic cable assembly comprises a first fiber optic cable section comprising a first plurality of optical fibers, and a second fiber optic cable section comprising a second plurality of optical fibers. Each optical fiber of the first and second pluralities of optical fibers includes a pre-coated section and a stripped section. The fiber optic cable assembly further comprises a plurality of fusion splices including a plurality of splice joints joining ends of the stripped sections of the first plurality of optical fibers with ends of the stripped sections of the second plurality of optical fibers. The fiber optic cable assembly further comprises a solid thermoplastic overcoating extending over the stripped sections of the first and the second pluralities of optical fibers, the plurality of splice joints, and at least a portion of the pre-coated sections of the first and the second pluralities of optical fibers. Each stripped section of the first plurality of optical fibers is substantially parallel, and each stripped section of the second plurality of optical fibers is substantially parallel.

In accordance with another embodiment of the disclosure, an apparatus is provided for applying a thermoplastic coating over fusion spliced at least one first and at least one second optical fibers that each include a stripped section and a pre-coated section, with a splice joint joining ends of the stripped sections of the at least one first and the at least one second optical fibers. The apparatus comprises at least one support surface supporting at least one pool of molten thermoplastic material, and a heating element configured to heat the at least one support surface to maintain the at least one pool of molten thermoplastic material in a molten state.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
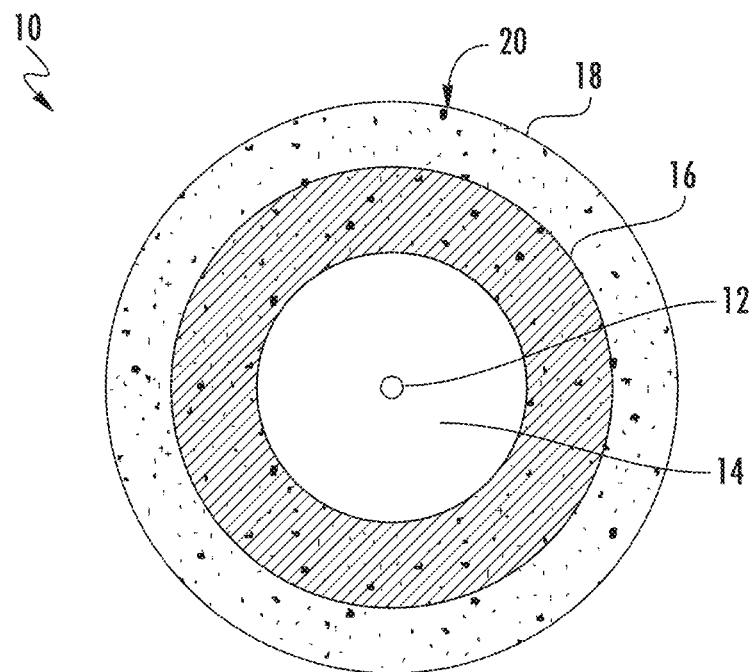
FIG. 1 is a cross-sectional view of a conventional coated optical fiber that may be subject to fusion splicing, prior to stripping of a multi-layer polymer coating from glass cladding.
Figure 2:
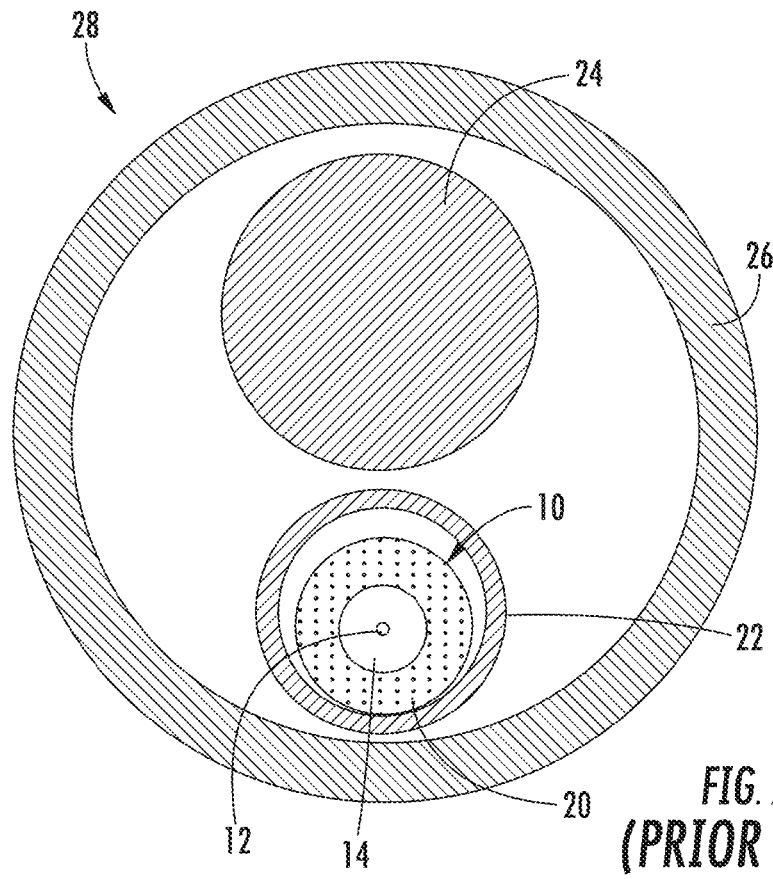
FIG. 2 is a cross-sectional view of a conventional splice protector including a heat shrink protection sleeve and an integrated strength member.
Figure 3A:
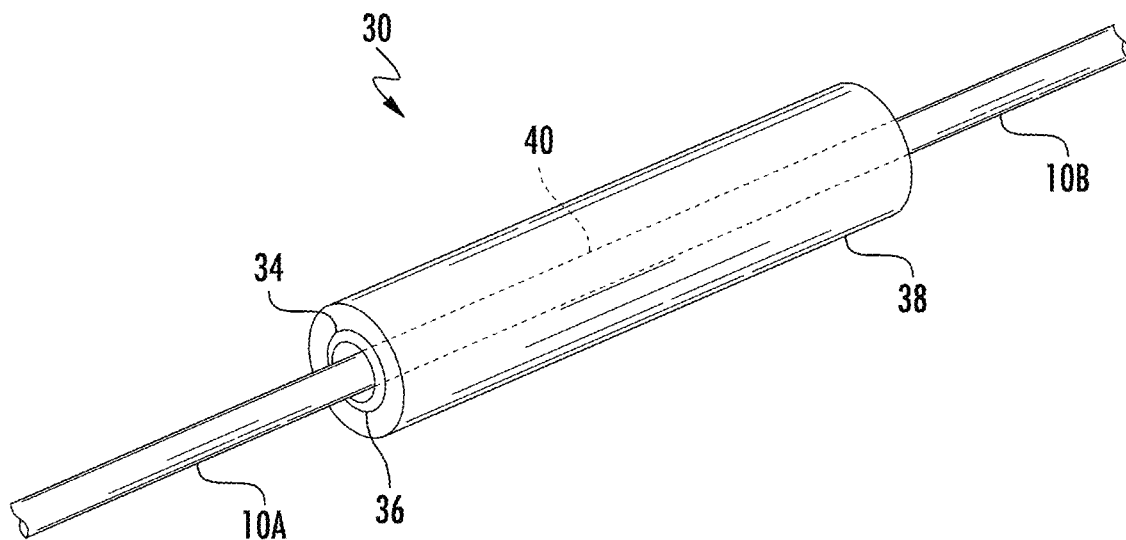
FIG. 3A is a schematic perspective view of a conventional heat shrink protection sleeve used to protect a fusion splice including a splice joint between two optical fibers.
Figure 3B:
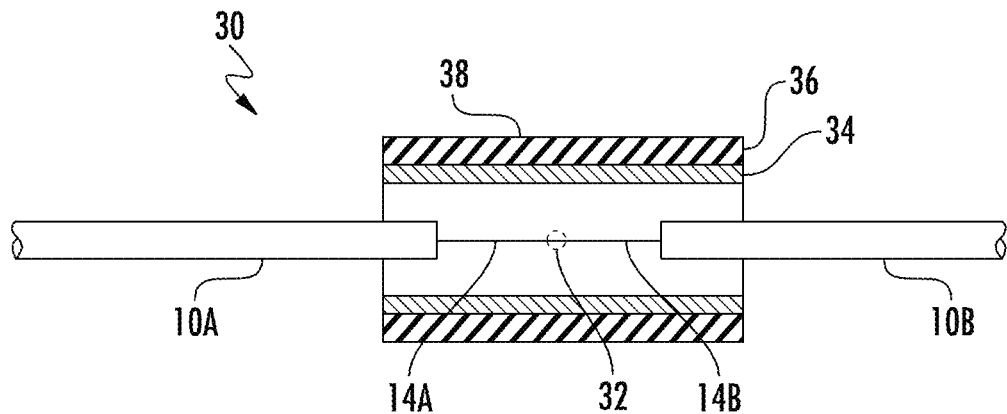
FIG. 3B is a schematic cross-sectional view of the heat shrink protection sleeve and optical fibers of FIG. 3A, with schematic illustration of the splice joint between stripped portions of the two optical fibers.

Various embodiments will be further clarified by examples in the description below. In general, the description relates to a fiber optic cable assembly with at least one thermoplastically overcoated fusion splice (or splice joint), a method for protecting fusion spliced optical fibers, and an apparatus for applying a thermoplastic coating over fusion spliced optical fibers.

As will be discussed in more detail below, exemplary aspects relate to contacting of stripped sections and pre-coated sections of fusion spliced at least one first and at least one second optical fibers with molten thermoplastic material, followed by cooling of the molten thermoplastic material to form a solid thermoplastic overcoating arranged over a splice joint as well as stripped sections and pre-coated sections of the optical fibers. In certain embodiments, stripped sections and pre-coated sections of the at least one first and at least one second optical fibers are dipped into a pool of molten thermoplastic material, and removed. The molten thermoplastic material quickly cools to an ambient temperature (e.g., in a time frame of less than 10 seconds, less than 5 seconds, or less than 2 seconds), thereby rendering it amenable to further handling.

In certain embodiments, pre-coated optical fibers subject to being fusion bonded and overcoated according to methods disclosed herein are prepared for fusion bonding (e.g., by stripping ends thereof) utilizing non-contact fiber stripping methods and/or apparatuses, such as those disclosed in U.S. Pat. No. 9,167,626 ("the '626 Patent"), which is hereby incorporated by reference. Briefly, the '626 Patent discloses use of a heater configured for heating a heating region to a temperature above a thermal decomposition temperature of at least one coating of an optical fiber, a securing mechanism for securely positioning a lengthwise section of the optical fiber in the heating region, and a controller operatively associated with the heater and configured to deactivate the heater no later than immediately after removal of the at least one coating from the optical fiber. Thermal decomposition of at least one coating of an optical fiber reduces or minimizes formation of flaws in optical fibers that may be generated by mechanical stripping methods and that can reduce their tensile strength. Following stripping of at least one coating layer from the ends of the optical fibers, the bare glass ends of the optical fibers may be fusion bonded using conventional fusion bonding method steps known to those skilled in the art. Variations of the techniques disclosed in the '626 Patent are disclosed in U.S. Patent Application Publication Nos. 2016/0349453 and 2017/0001224, the disclosures of which are also hereby incorporated by reference herein. Non-contact stripping methods using lasers or hot gases, are also possible in certain embodiments.

As noted previously, a solid thermoplastic overcoating formed by methods disclosed herein is arranged over a splice joint as well as over stripped sections and pre-coated sections of optical fibers (e.g., including at least a short distance of the pre-coated sections proximate to the stripped sections). At least a portion of the solid thermoplastic overcoating includes a diameter that exceeds a diameter of one or more pre-coated sections of the optical fibers. Exemplary optical fibers include 900 µm buffered fibers, although methods and cable assemblies disclosed herein may utilize optical fibers of other types and sizes (e.g., 250 µm or 200 µm coated fibers without any additional buffer layer). To avoid thermal degradation of one or more coating layers of the pre-coated sections of the optical fibers, molten thermoplastic material to be used for overcoating should be maintained at a processing temperature below a melt temperature of the one or more coating layers. To promote formation of a suitable overcoating, the molten thermoplastic material may also be maintained at a processing temperature at which the molten thermoplastic material has a melt viscosity in a range of from about 100 centipoises (cps) to about 10,000 cps, or more preferably in a subrange of from about 1000 cps to about 10,000 cps, or more preferably in a subrange of from about 2000 cps to about 4000 cps.

Desirable thermoplastic overcoating materials differ from conventional melt flow adhesive glue sticks or typical thermoplastic materials in that they should desirably: have a medium viscosity (e.g., according to one or more of the ranges outlined above) at a processing temperature, be chemically stable at the processing temperature, have a glass transition temperature of no greater than −40° C., have a service temperature spanning at least a range of from −40° C. to 85° C. without suffering significant mechanical and/or optical performance degradation, exhibit strong adhesion to fiber coating layers and bare glass, be free from charring, and/or exhibit minimal to no outgassing (e.g., of volatile organic compounds and/or other constituents). A glass transition temperature is the point at which a material goes from a hard brittle state to a flexible or soft rubbery state as temperature is increased. A common method for determining glass transition temperature uses the energy release on heating in differential scanning calorimetry. If a plastic (e.g., thermoplastic) material associated with an optical fiber is exposed to a temperature below its glass transition temperature, the material will become very hard, and the optical fiber may be susceptible to micro bend losses. In certain embodiments, service temperature of a thermoplastic overcoating material may be determined by compliance with one or more industry standards for telecommunication fiber reliability testing, such as (but not limited to): ITU-T G.652, IED60793-2, Telcordia GR-20-CORE and TIA/EIA-492. In certain embodiments, a solid thermoplastic material comprises at least one material selected from the group consisting of: a polyamide material, a polyolefin material, a polyamide-polyolefin copolymer, a polyamide grafted polyolefin, and copolyester. Other thermoplastic materials may be used.

Formation of a solid thermoplastic overcoating over at least a short distance of pre-coated sections of optical fibers bounding a spliced segment (e.g., at either end of stripped sections joined at a splice joint) beneficially ensures that all previously stripped (glass) sections are fully overcoated. In certain embodiments, a solid thermoplastic overcoating extends over a length of a pre-coated section of each of first and second optical fibers, wherein the overcoated length of each pre-coated section is in a range of from about 1 mm to about 10 mm. Additionally, since the solid thermoplastic overcoating may adhere to one or more coating layers of an optical fiber more readily than to (pre-stripped) exposed glass sections, provision of a solid thermoplastic overcoating of sufficient length to overlap at least a short distance of pre-coated sections of optical fibers bounding a spliced segment promotes more secure adhesion between the solid thermoplastic overcoating and the fusion spliced segment as a whole. In certain embodiments, a solid thermoplastic overcoating and a fusion spliced segment utilize a thermoplastic material that is devoid of additives configured to promote adhesion to glass, such as silane. A solid thermoplastic overcoating as disclosed herein is preferably not subject to delamination during normal handling over the required service conditions and lifetime of an optical fiber assembly.

In preferred embodiments, a solid thermoplastic overcoating is water-resistant and serves to block moisture from reaching the splice joint and the previously stripped glass region of a fusion spliced segment of optical fibers. This is beneficial since moisture is known to chemically interact with glass cladding of optical fibers and cause expansion of micro defects in the glass, thereby leading to long-term failure of optical fibers. The solid thermoplastic overcoating is preferably also devoid of sharp particles (e.g., inorganic filler particles) and air bubbles. The solid thermoplastic overcoating may also be devoid of a UV curable material. In certain embodiments, formation of air bubbles may be reduced by contacting stripped sections and pre-coated sections of fusion spliced first and second optical fibers with molten thermoplastic material in a subatmospheric pressure environment (e.g., in a range of from 0.01 to 0.9, or 0.1 to 0.8, or 0.1 to 0.7 times local atmospheric pressure), such as may be attained in a partially evacuated chamber or other enclosure.

In certain embodiments, a pool of molten thermoplastic material may be maintained in a reservoir that may be heated in an oven or with a standalone heater. Temperature of the thermoplastic material may be maintained at a desired level via feedback from one or more temperature sensors. If desired, the reservoir may embody a length that is substantially greater (e.g., at least two times greater, three times greater, five times greater, or ten times greater) than its width, to accommodate one or more spliced segments of optical fibers. In certain embodiments, a reservoir may be trough-like in character, embodying a recess relative to a surrounding surface or peripheral edges. At least portions of a reservoir may desirably be formed in a substrate of a material that is non-reactive with the molten thermoplastic material and exhibits desired properties with respect to heat capacity and adhesion prevention. In certain embodiments, a reservoir may be formed in or on a substrate of one or more metal (e.g., stainless steel or aluminum) and/or ceramic materials, optionally anodized or overlaid with one or more adhesion prevention and/or corrosion prevention layers such as polytetrafluoroethylene or the like.

Figure 4A:
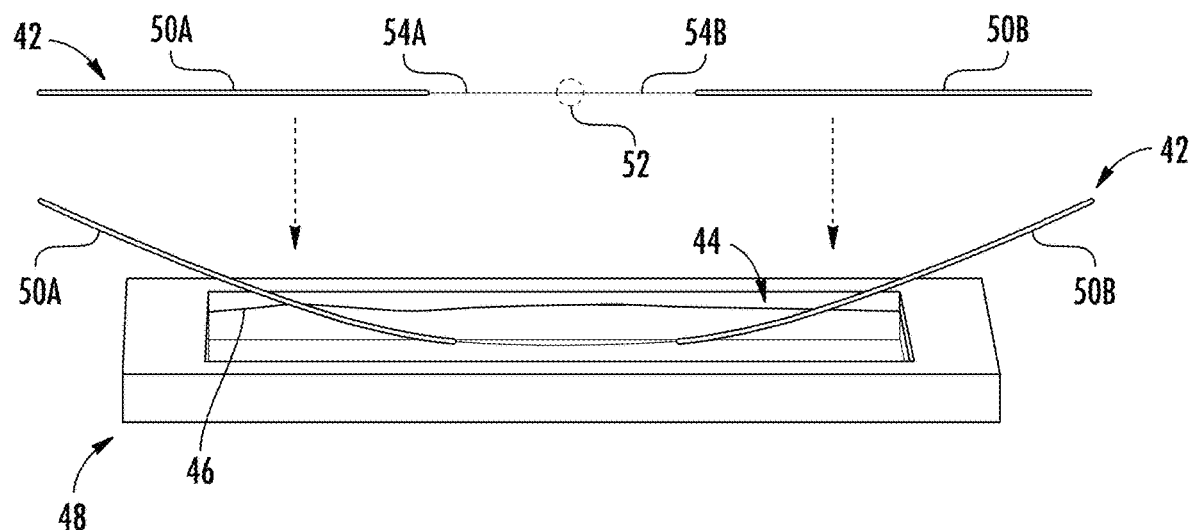
FIG. 4A is a perspective view illustration of a bare fusion spliced section of two optical fibers in a taut state, and arranged above an illustration of the same fusion spliced section of two optical fibers in a slackened state and dipped into a recessed rectangular reservoir containing a pool of molten thermoplastic material.

FIG. 4A illustrates a bare fusion spliced section 42 of two pre-coated optical fibers 50A, 50B (also referred to simply as "coated optical fibers" in this disclosure) in a taut state, with a splice joint 52 joining two stripped sections 54A, 54B of the optical fibers 50A, 50B, and arranged above an illustration of the same fusion spliced section 42 in a slackened state and being dipped into rectangular reservoir 44 defined in a substrate 48 and containing a pool of molten thermoplastic material 46. The reservoir 44 is recessed relative to peripheral portions of the substrate. The pre-coated optical fibers 50A, 50B shown in FIG. 4A and subsequent figures may be 250 µm coated optical fibers in some embodiments. Thus, the pre-coated optical fibers 50A, 50B shown in the figures may have an outer diameter of about 250 µm in some embodiments. Stated differently, the pre-coated optical fibers 50A, 50B may each have a nominal outer diameter of 250 µm in some embodiments. The term "nominal outer diameter" in this disclosure refers to the stated value for the outer diameter of the element in question (e.g., the pre-coated optical fibers 50A, 50B in this instance) and/or a commonly-accepted value for an actual value of the outer diameter of the element in question. In some embodiments, sections of the pre-coated optical fibers 50A, 50B that are not shown in the figures may include a buffer layer or furcation tube layer (i.e., an additional coating layer) that brings the nominal outer diameter to 900 µm. Additionally, in some embodiments, the stripped sections 54A, 54B each have a nominal outer diameter of 125 µm, or another desired value, such as 80 µm, 100 µm, 150 µm, etc.

The lower portion of FIG. 43A shows the fusion spliced section 42 bowing downward due to slackening of tension applied to ends of the optical fibers 50A, 50B. At least a central portion of the fusion spliced section 42 (including the stripped sections 54A, 54B, and splice joint 52, and at least short lengths of the coated optical fibers 50A, 50B shown in FIG. 4A) is immersed in the pool of molten thermoplastic material 46 at a desired processing temperature (e.g., a processing temperature below a melt temperature of one or more coating layers, while simultaneously conferring the thermoplastic material with a melt viscosity in a range of from about 100 cps to about 10,000 cps or another range disclosed herein). Thereafter, the portion of the fusion spliced section 42 that was immersed in the pool of molten thermoplastic material 46 is removed from the rectangular reservoir 44 at a speed (or removal rate) that preferably takes into account the melt viscosity of the molten thermoplastic material 46 to provide a desired thermoplastic coating thickness.

Figure 4B:
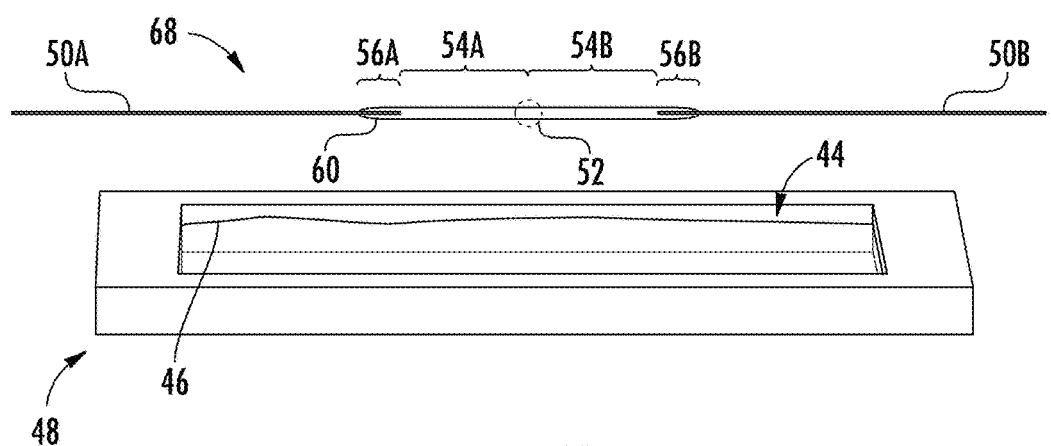
FIG. 4B is a perspective view illustration of an overcoated fusion spliced section of two optical fibers in a taut state with a solid overcoating of thermoplastic material over the fusion spliced section, obtained following removal of the fusion spliced section of two optical fibers of FIG. 4A from the pool of molten thermoplastic material.

FIG. 4B is a perspective view illustration of an overcoated fusion spliced section 68 obtained following removal of the fusion spliced segment 42 of FIG. 4A from the pool of molten thermoplastic material 46 contained in the rectangular reservoir 44 defined in the substrate 48. As shown in FIG. 4B, the overcoated fusion spliced section 68 is in a taut state, and includes a solid overcoating 60 of thermoplastic material extending over the splice joint 52, the previously stripped sections 54A, 54B, and short lengths 56A, 56B of the coated optical fibers 50A, 50B. As illustrated, the solid overcoating 60 includes an outer diameter that is substantially constant over nearly the entirety of its length. In certain embodiments, a uniform thickness of the solid overcoating 60 can be obtained by first elevating (e.g., lifting) one optical fiber (e.g., optical fiber 50A) steadily during removal from the pool of molten thermoplastic material 46, and having another optical fiber (e.g., optical fiber 50B) exit the pool of molten thermoplastic material 46 thereafter. Such a step may cause molten thermoplastic material to flow in a direction generally toward the later-removed portion of the overcoated region. In certain embodiments, a first portion of an overcoated segment may be removed from a pool of molten thermoplastic material at a first removal rate, and a second portion of an overcoated segment may be removed from the pool at a second removal rate that differs from the first removal rate. If any excess thickness overcoating regions should be formed, then in certain embodiments, such excess thickness overcoating can be reduced or removed by contacting the excess thickness portion with a heated surface to effectuate local reflow and/or removal of the excess thickness portion of the solid thermoplastic overcoating. Conversely, in certain embodiments, an increased thickness (e.g., central) region of a solid thermoplastic overcoating may be formed by increasing the rate of removal of a portion of a fusion spliced section from a pool of molten thermoplastic material.

Figure 5:
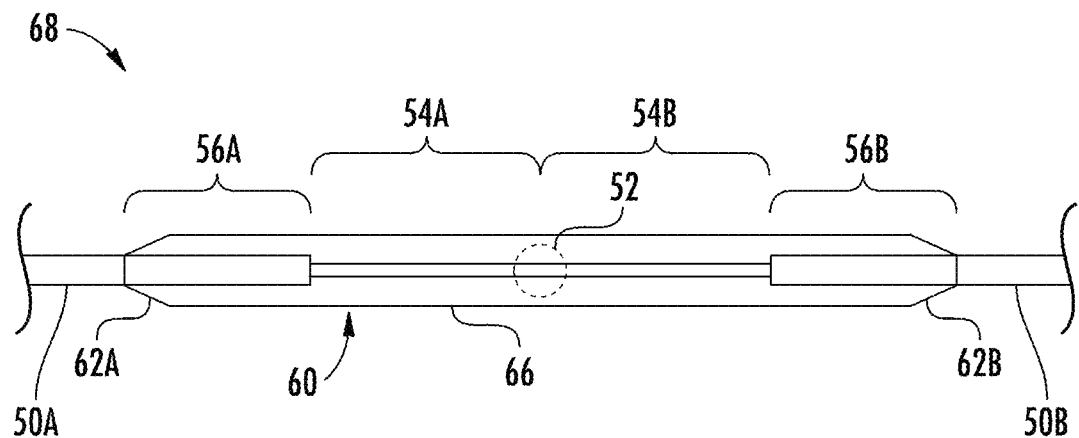
FIG. 5 is a schematic side view illustration of the overcoated fusion spliced section of optical fibers obtained in FIG. 4B, with the solid overcoating of thermoplastic material having a substantially constant outer diameter and being arranged over stripped sections of the first and second optical fibers, a splice joint, and pre-coated sections of the first and second optical fibers.

FIG. 5 is a schematic side view illustration of the overcoated fusion spliced section 68 of optical fibers 50A, 50B obtained in FIG. 4B, wherein the solid overcoating 60 of thermoplastic material has a substantially constant outer diameter over the majority of its length. Each optical fiber 50A, 50B includes a coating, with portions of each optical fiber 50A, 50B being previously stripped of such coating to form stripped sections 54A, 54B embodying glass cladding. Ends of the stripped sections 54A, 54B are fusion spliced to form a splice joint 52. The solid overcoating 60 of thermoplastic material extends over the splice joint 52, the previously stripped sections 54A, 54B, and short lengths 56A, 56B of the coated optical fibers 50A, 50B. As shown in FIG. 5, the solid overcoating 60 may include tapered thickness ends 62A, 62B and a central section 66 having a substantially constant outer diameter that exceeds an outer diameter of the pre-coated optical fibers 50A, 50B, with the pre-coated optical fibers 50A, 50B including an outer diameter that includes that of the previously stripped sections 54A, 54B embodying glass cladding material.

As shown in FIG. 5, at least portions of the solid overcoating 60 of thermoplastic material include an outer diameter that exceeds an outer diameter of the pre-coated optical fibers 50A, 50B. As mentioned above, the coated optical fibers 50A, 50B may each have a nominal outer diameter of 0.25 mm (250 µm) in some embodiments. In certain embodiments, the solid overcoating 60 of thermoplastic material may include an outer diameter in a range that is greater than 0.25 mm, optionally bounded an upper value of about 0.9 mm in diameter. Thus, in certain embodiments, a maximum nominal outer diameter of the solid overcoating 60 may be 0.9 mm, similar to the nominal outer diameter of a 900 µm buffer layer or furcation tube layer in embodiments including such a layer. In certain embodiments, the solid overcoating 60 of thermoplastic material includes a minimum thickness (i.e., radial distance between an outer diameter of the pre-coated optical fibers 50A, 50B and an outer diameter of the solid overcoating 60) of at least about 50 µm, at least about 60 µm, at least about 80 µm, or at least about 100 µm.

Figure 6:
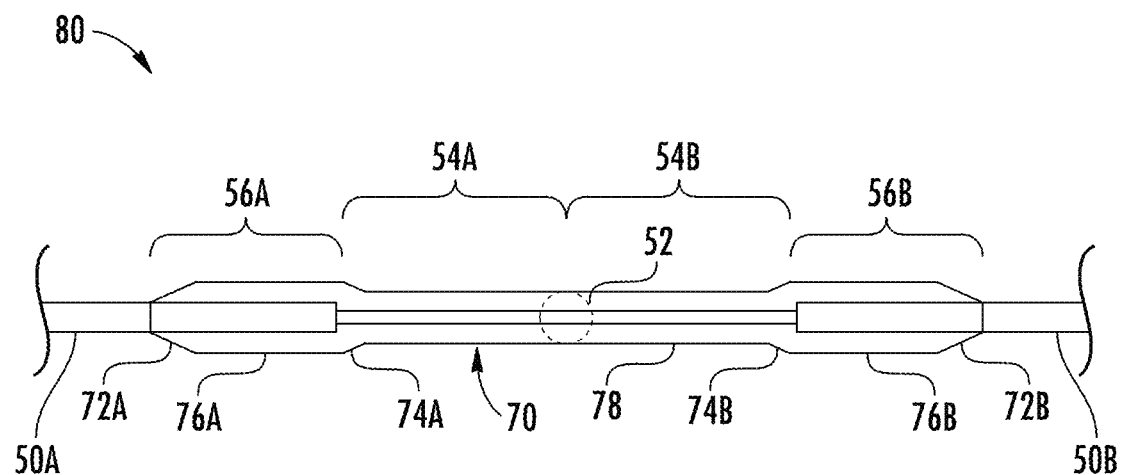
FIG. 6 is a schematic side view illustration of a fusion spliced section of optical fibers including a solid overcoating of thermoplastic material having a substantially constant thickness but an outer diameter that varies along intermediate portions thereof, with the solid overcoating of thermoplastic material arranged over stripped sections of the first and second optical fibers, a splice joint, and pre-coated sections of the first and second optical fibers.

FIG. 6 is a schematic side view illustration of a fusion spliced section 80 of optical fibers 50A, 50B including a solid overcoating 70 of thermoplastic material having a substantially constant thickness but an outer diameter that varies along intermediate portions thereof. Portions of each optical fiber 50A, 50B previously stripped of coating layers form stripped sections 54A, 54B embodying glass cladding, with ends of the stripped sections 54A, 54B being fusion spliced to form a splice joint 52. The solid overcoating 70 of thermoplastic material extends over the splice joint 52, the previously stripped sections 54A, 54B, and short lengths 56A, 56B of the coated optical fibers 50A, 50B. As shown in FIG. 6, the solid overcoating 70 may include larger diameter sections 76A, 76B proximate to tapered thickness ends 72A, 72B thereof, and tapered transition regions 74A, 74B (proximate to transitions between the coated optical fibers 50A, 50B and the stripped sections 54A, 54B) embodying transitions between the larger diameter sections 76A, 76B and a reduced diameter central section 78. Although the larger diameter sections 76A, 76B embody a greater diameter than the central section 78, in certain embodiments the solid overcoating 70 over both sections has a substantially constant thickness between an outer surface of the respective section and an underlying surface (i.e., either the (glass) stripped sections 54A, 54B or the short lengths 56A, 56B of the coated optical fibers 50A, 50B). As shown, the central section 78 of the solid overcoating 70 has a substantially constant outer diameter that exceeds an outer diameter of the coated optical fibers 50A, 50B, and the larger diameter sections 76A, 76B of the solid overcoating 70 have outer diameters that exceed that of the coated optical fibers 50A, 50B, and include an outer diameter that includes that of the central section 78 of the solid overcoating 70. Since a solid overcoating may have a non-circular cross-section, it may also be said the solid overcoating 70 has a height and a width that vary with position, since the height and width of the solid overcoating 70 are greater in the larger diameter sections 76A, 76B than in the reduced diameter central section 78. In certain embodiments, at least one of the height or the width may vary over at least a portion of a length of a solid thermoplastic overcoating arranged over at least one fusion splice joint.

Although the apparatus of FIGS. 4A and 4B, is sufficient to overcoat one or more fusion spliced sections of optical fibers, the use of a deep trough-like pool of molten thermoplastic material entails certain difficulties. Firstly, the thermoplastic coating process is highly user-dependent as the fiber splice must first form a bow so that the region to be coated can be immersed into the trough. The coating geometry is dependent on the depth of the pool of molten thermoplastic material. When the process is extended to the coating of optical fiber ribbon splices, the increased surface area of the ribbon splice tends to withdraw a large amount of thermoplastic material away from the pool, causing highly irregular coating shape and thickness (which leads to material waste and lack of product uniformity). Additionally, a deep pool of molten thermoplastic material may cause overheating of thermoplastic material at the bottom of the reservoir to maintain a desired temperature at the surface, thereby leading to thermoplastic material degradation and reduced pot life. Moreover, any unused thermoplastic material in the trough-like reservoir is difficult to remove, and air bubbles can be trapped inside the bath.

To address the foregoing concerns, in certain embodiments a pool of molten thermoplastic material may be maintained in a molten state (e.g., above the melt temperature at a medium viscosity of a few thousand cps) on a substantially flat heated surface. Due to faster heat dissipation at edges of a heated surface, the molten thermoplastic material tends to stop flowing at the edges, such that a layer of thermoplastic may be formed with a thickness that can be set from about 0.1 mm to about 3 mm. An apparatus including a substantially flat heated surface allows dip coating of single-fiber splices or multi-fiber array splices (e.g., ribbon splices) without bending or crossing.

In certain embodiments, a heating apparatus configured for thermoplastic coating of fusion spliced optical fibers includes heated surface supporting a molten thermoplastic material that is devoid of a cover or other obstruction positioned above the heated surface. In this regard, such heating apparatus differs from a conventional molding apparatus that typically includes means for enclosing a mold cavity.

Figure 7:
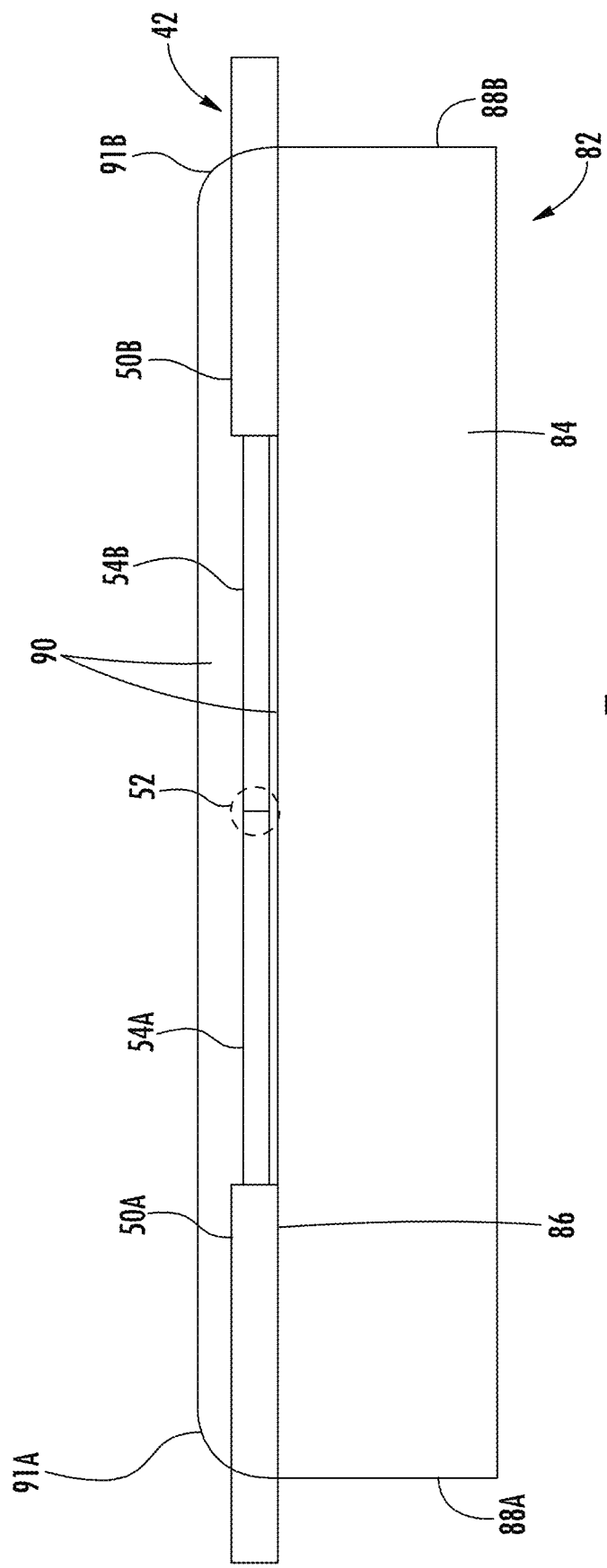
FIG. 7 is a schematic side view illustration of a fusion spliced section of two optical fibers dipped into a pool of molten thermoplastic material arranged atop a substantially level, flat heated surface of a heating apparatus, with the pool extending to lateral edges of the heated surface.

FIG. 7 illustrates a fusion spliced section 42 of two optical fibers 50A, 50B (including stripped sections 54A, 54B and a splice joint 52) dipped into a pool of molten thermoplastic material 90 arranged atop a substantially level, flat heated surface 86 of a heating apparatus 82. The heating apparatus 82 includes a body 84 that may contain an internal cartridge heater (not shown), with lateral edges 88A, 88B of the body 84 also bounding the flat heated surface 86. The molten thermoplastic material 90 extends to the lateral edges 88A, 88B without overflowing due to lower temperature at the lateral edges 88A, 88B, and due to surface tension at edges 91A, 91B of the molten thermoplastic material 90. As shown, both lateral edges 88A, 88B of the heated surface 86 are lower in height than (e.g., at least 0.5 mm below) a top surface of the pool of molten thermoplastic material 90, with the pool extending to the lateral edges 88A, 88B. Unstripped portions of the optical fibers 50A, 50B are supported against the heated surface 86, thereby permitting the stripped sections 54A, 54B and the splice joint 52 to be kept straight while immersed in the pool of molten thermoplastic material 90. A combined length of the stripped sections 54A, 54B of the optical fibers 50A, 50B is shorter than a length of the pool of molten thermoplastic material 90 extending between the lateral edges 88A, 88B. The body 84 may be formed of one or more metal (e.g., stainless steel or aluminum) and/or ceramic materials, with one or more surfaces thereof optionally being anodized or overlaid with one or more adhesion prevention and/or corrosion prevention layers. For example, the heated surface 86 may include a thin layer of PTFE, which has a stable long-term operating temperature that is higher than the melting point of the molten thermoplastic material 90.

Figure 8:
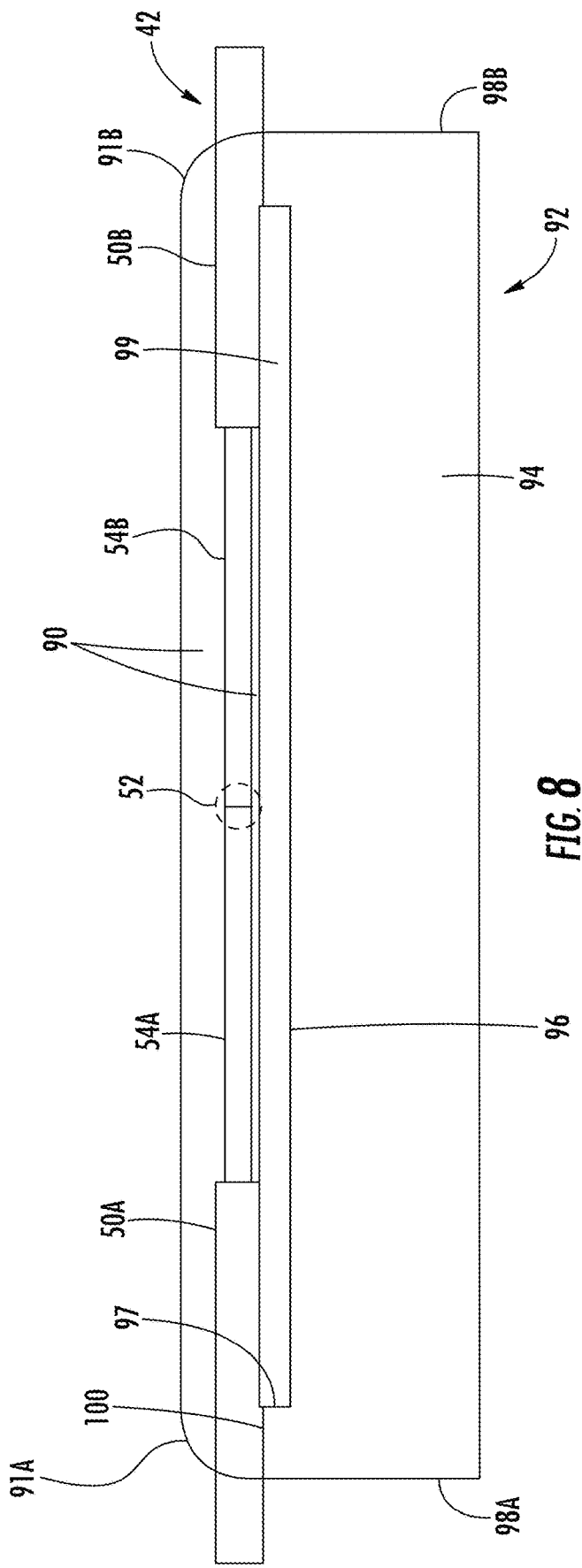
FIG. 8 is a schematic side view illustration of a fusion spliced section of two optical fibers dipped into a pool of molten thermoplastic material arranged partially within a recessed area defined in a heated surface of a heating apparatus, and further extending above the reservoir to lateral edges of the heated surface.

FIG. 8 illustrates a heating apparatus 92 according to another embodiment in which a pool of molten thermoplastic material 90 is arranged partially within a recessed area 99 that is bounded by a heated surface 96 and is laterally inset relative to an upper peripheral surface 100 of a body 94. A short interior wall 97 serves as a boundary between the upper peripheral surface 100 and the recessed area 99. As shown, a fusion spliced section 42 of two optical fibers 50A, 50B (including stripped sections 54A, 54B and a splice joint 52) is present within the pool of molten thermoplastic material 90, with unstripped portions of the optical fibers 50A, 50B being supported against the upper peripheral surface 100. Lateral edges 98A, 98B of the body 94, which bound the upper peripheral surface 100, are lower in height than a top surface of the pool of molten thermoplastic material 90, such that the pool extends to the lateral edges 98A, 98B. Due to lower temperature at the lateral edges 98A, 98B as well as surface tension at edges 91A, 91B of the molten thermoplastic material 90, the molten thermoplastic material 90 extends to the lateral edges 98A, 98B without overflowing. The configuration of the heating apparatus 92 permits the stripped sections 54A, 54B and the splice joint 52 may be kept straight while immersed in the pool of molten thermoplastic material 90.

Figure 9:
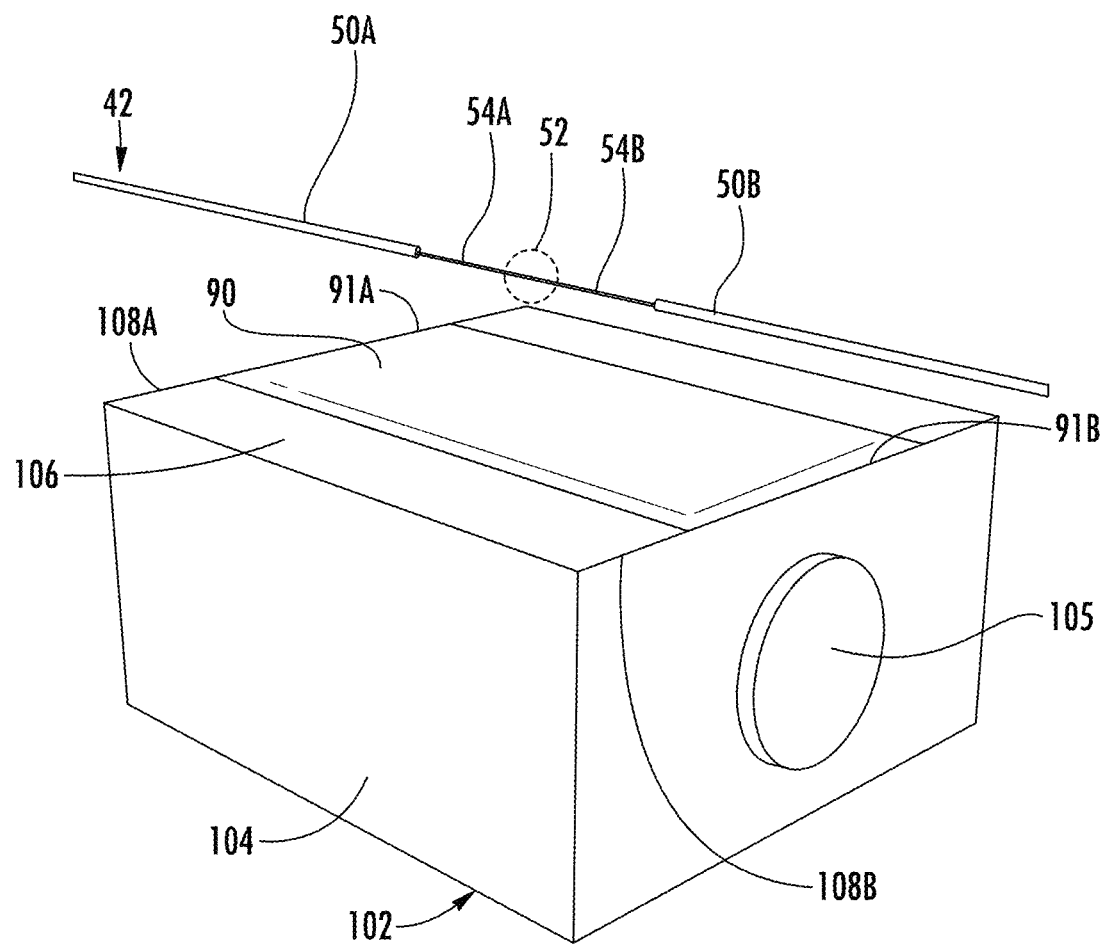
FIG. 9 is an upper perspective view illustration of a bare fusion spliced section of two optical fibers arranged above a pool of molten thermoplastic material arranged atop a substantially level, flat heated surface of a heating apparatus, with the pool extending to two lateral edges of the substantially flat heated surface.
Figure 10:
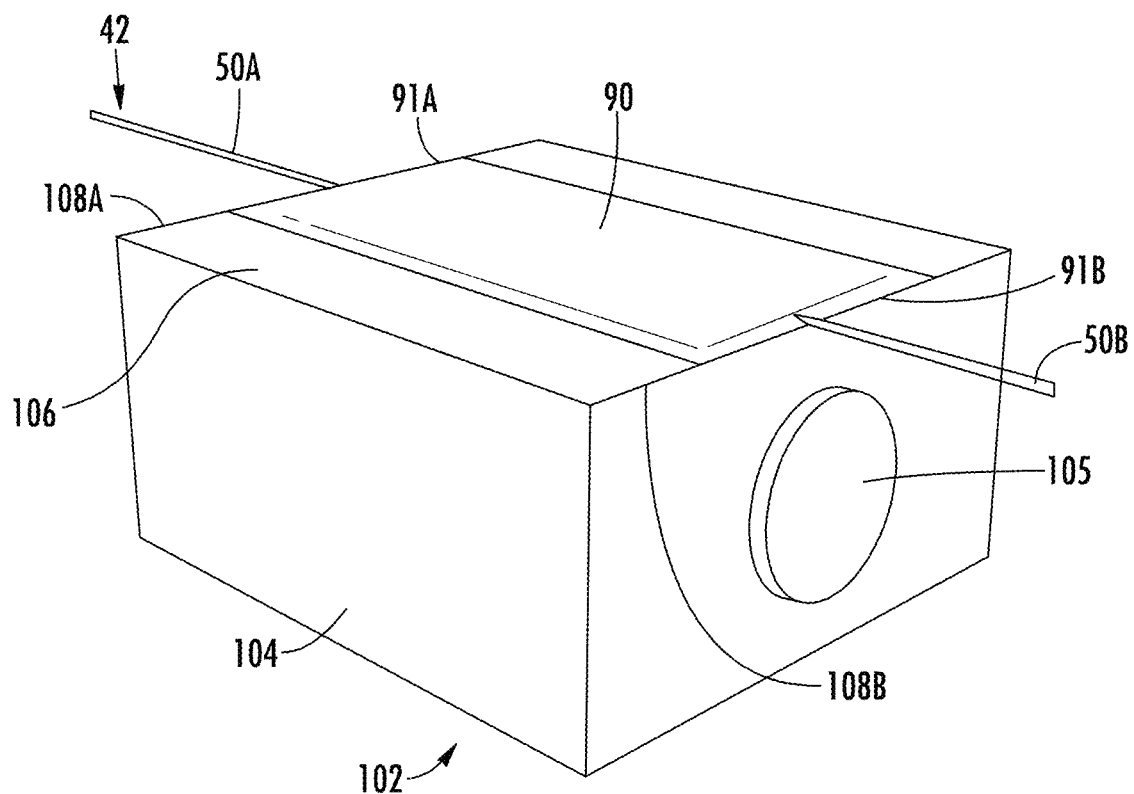
FIG. 10 is an upper perspective view illustration of the items of FIG. 9, but with the fusion spliced section of two optical fibers disposed in the pool of molten thermoplastic material atop the substantially level, flat heated surface of the heating apparatus.

FIGS. 9 and 10 illustrate a heating apparatus 102 according to an embodiment in which a pool of molten thermoplastic material 90 is arranged atop a substantially level, flat heated surface 106. In this regard, the heating apparatus 102 may be similar to the heating apparatus 82 (FIG. 7). Lateral edges 91A, 91B of the pool of molten thermoplastic material 90 extend to lateral edges 108A, 108B of the flat heated surface 106 without overflowing, due to lower temperature at the lateral edges 108A, 108B as well as surface tension of the molten thermoplastic material 90. The heating apparatus 102 includes a body 104 that contains an internal electric cartridge heater 105. Lateral edges 108A, 108B of the heated surface 106 are lower in height than a top surface of the pool of molten thermoplastic material 90. FIG. 9 illustrates a bare fusion spliced section 42 of two optical fibers 50A, 50B (including stripped sections 54A, 54B and a splice joint 52) arranged above the pool of molten thermoplastic material 90, with the splice joint 52 roughly centered above the pool, and with the length of the pool exceeding the combined length of the stripped sections 54A, 54B. FIG. 10 provides the same view as FIG. 9, but with the stripped sections 54A, 54B and the splice joint 52 of the fusion spliced section 42 disposed in the pool of molten thermoplastic material 90. Unstripped portions of the optical fibers 50A, 50B are supported against the heated surface 106, thereby permitting the stripped sections 54A, 54B and the splice joint 52 to be kept straight while immersed in the pool of molten thermoplastic material 90.

In operation of the heating apparatus 102 to thermoplastically coat the fusion spliced section 42 of optical fibers 50A, 50B, the molten thermoplastic material 90 is initially displaced by the fusion spliced section 42 as the optical fibers 50A, 50B are lowered to contact the heated surface 106. Such positioning provides support to the fusion spliced section 42 and promotes even coverage of the optical fibers 50A, 50B with molten thermoplastic material 90. As the optical fibers 50A, 50B are heated within about two seconds, both the glass surface of the stripped sections 54A, 54B and the secondary fiber coating surface of the unstripped portions of the optical fibers 50A, 50B become wetted with the molten thermoplastic material 90. Such wetting eventually submerges the fusion spliced section 42 from both ends. This process prevents the entrapment of air bubbles, and also provides an accurate timing indication for good adhesion of the thermoplastic material to the fusion spliced section 42. In certain embodiments, the optical fibers 50A, 50B and the fusion spliced section 42 may be rotated about a longitudinal axis thereof inside the molten thermoplastic material 90 to obtain a more uniform thermoplastic coating. Thereafter, the fusion spliced section 42 is lifted from the pool of molten thermoplastic material 90 using the same techniques previously described herein. The fusion spliced section 42 bearing a thermoplastic material coating is quickly cooled down to ambient temperature due to its small thermal mass. The coating process is complete once the thermoplastic material solidifies.

Figure 11:
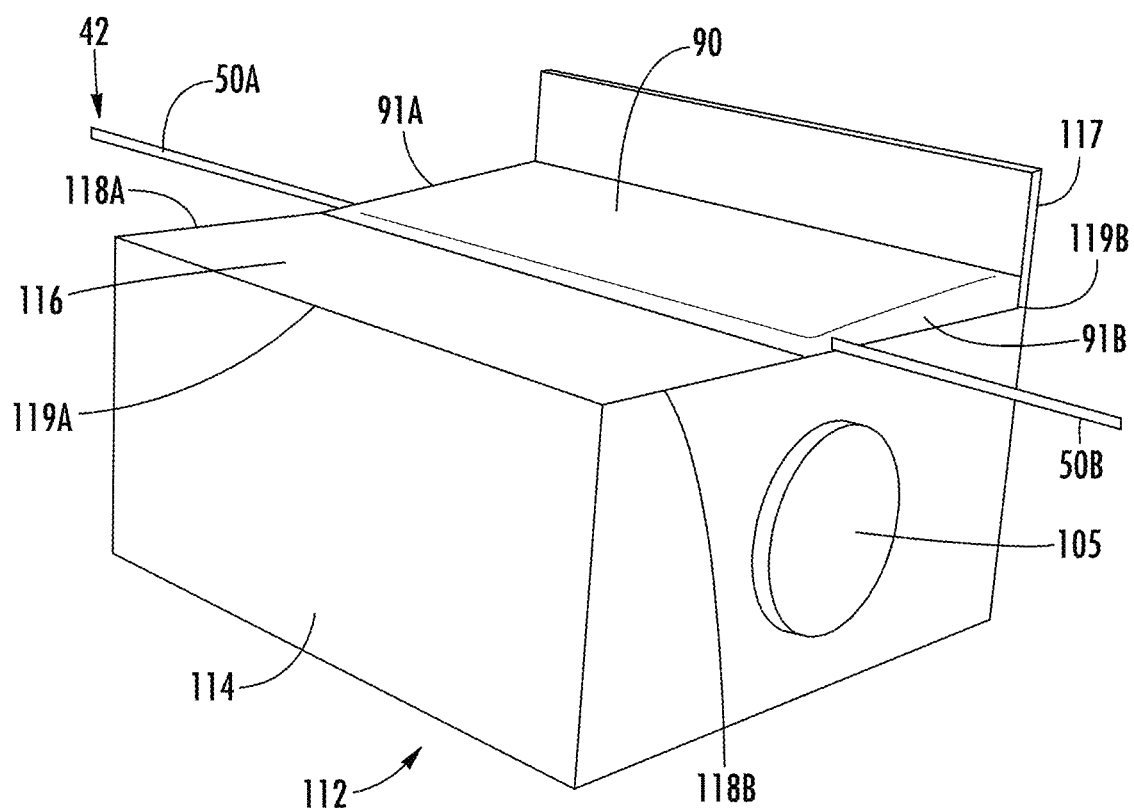
FIG. 11 is an upper perspective view illustration of a fusion spliced section of two optical fibers arranged in a pool of molten thermoplastic material supported by a substantially flat, inclined heated surface bounded on one side by a vertically extending border wall, with the pool extending to the two lateral edges and to the border wall.

FIG. 11 illustrates a fusion spliced section 42 of two optical fibers 50A, 50B arranged in a pool of molten thermoplastic material 90 supported by a substantially flat, inclined heated surface 116 of a heating apparatus 112 according to another embodiment. The inclined heated surface 116 is higher at a front edge 119A and lower at a rear edge 119B that is bounded by a vertically extending border wall 117. In certain embodiments, an inclined heated surface may be inclined from horizontal in an angular range of from about 1 to 12 degrees, or in an angular range of from about 6 to 12 degrees. Inclination of the heated surface 116 causes the pool of molten thermoplastic material 90 to have a depth that increases with proximity to the rear edge 119B of the inclined heated surface 116. Lateral edges 91A, 91B of the pool of molten thermoplastic material 90 extend to lateral edges 118A, 118B of the inclined heated surface 116 without overflowing, due to lower temperature at the lateral edges 118A, 118B as well as surface tension of the molten thermoplastic material 90. The heating apparatus 102 includes a body 114 that contains an internal electric cartridge heater 105. As shown, a fusion spliced section 42 of optical fibers 50A, 50B is positioned horizontally in the pool of molten thermoplastic material 90 proximate to the inclined heated surface 116. The variable depth of the pool of molten thermoplastic material 90 permits a fusion spliced section 42 of optical fibers 50A, 50B to be immersed at different depths to obtain a desired thermoplastic coating thickness. Another benefit of the variable depth of the pool is that as the molten thermoplastic material 90 is reduced (e.g., partially depleted) after a number of overcoating operations, optical fibers 50A, 50B may be repositioned (e.g., rearward, toward the vertically extending border wall 117) to maintain a desired depth to achieve consistent coating.

Unlike the use of deep reservoirs containing molten thermoplastic material, the use of flat heat surfaces supporting a relatively shallow (e.g., 0.5 mm to 3 mm deep) pool of molten thermoplastic material does not tend to introduce air bubbles into the pool. The wetting of the optical fiber provides a reliable means for calibrating the viscosity condition of the molten thermoplastic material.

Due to the low thermal conductivity of the thermoplastic material, the temperature of the molten thermoplastic material near the heated surface is higher than at an area positioned close to an air interface. Providing a thinner layer of molten thermoplastic material (such as disclosed in the embodiments of FIGS. 7-11) ensures that all the thermoplastic material is heated to a relatively consistent temperature. In contrast, using a relatively deep trough-like reservoir (such as disclosed in the embodiment of FIGS. 3A to 4B) can lead to overheating of thermoplastic material at the bottom of the reservoir to maintain a desired temperature at the surface, with such overheating detrimentally leading to thermoplastic material degradation and reduced pot life.

Although FIGS. 4A-11 depict single fiber cables, in certain embodiments, optical fibers that are fusion spliced and protected with a solid thermoplastic coating may be part of optical fiber ribbons (e.g., ribbon cables). For example, an optical fiber ribbon may comprise a plurality of optical fibers held together in a matrix material (also known as a ribbonizing material). The matrix material and one or more coatings (if present) may be stripped from the plurality of optical fibers to prepare the optical fibers for fusion splicing to a similarly-prepared optical fiber ribbon. To this end, references to "first" and "second" optical fibers that are fusion spliced does not preclude the possibility of there being multiple first optical fibers and multiple second optical fibers fusion spliced (i.e., each first optical fiber being fusion spliced to one of the second optical fibers).

Figure 12A:
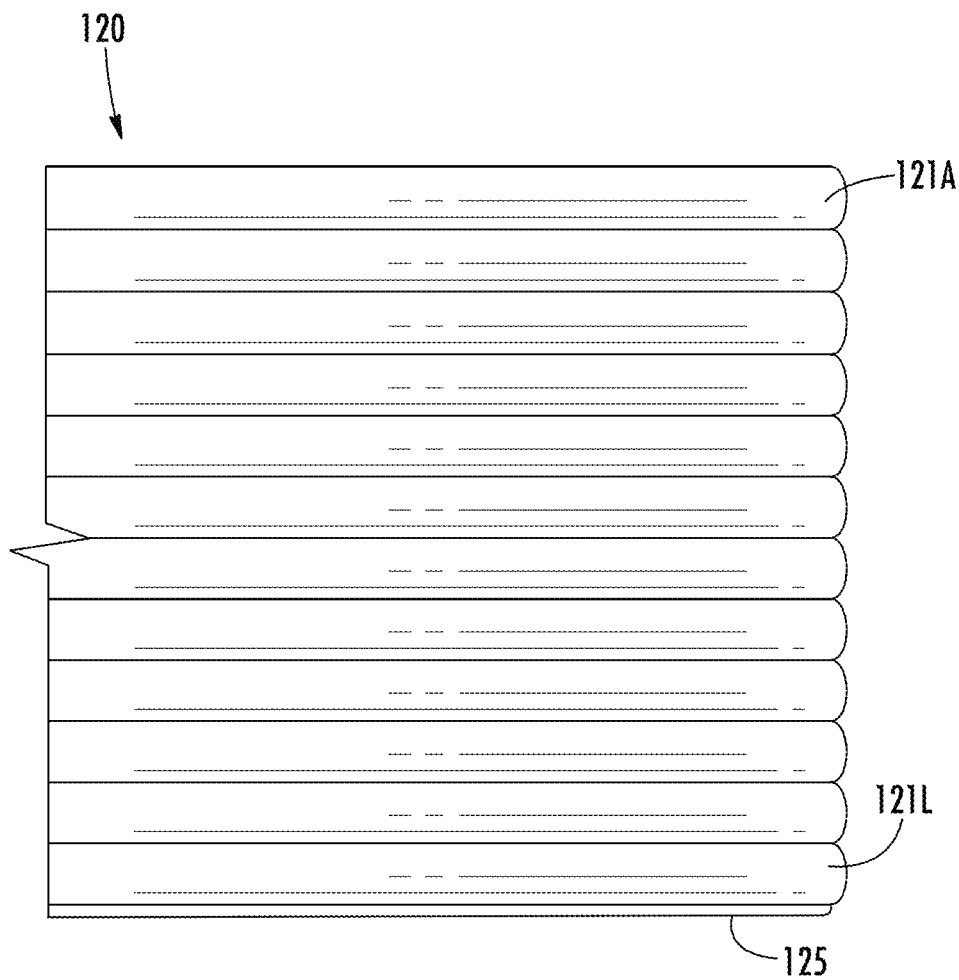
FIG. 12A is a top plan view of an end portion of a multi-fiber ribbon including twelve optical fibers.
Figure 12B:
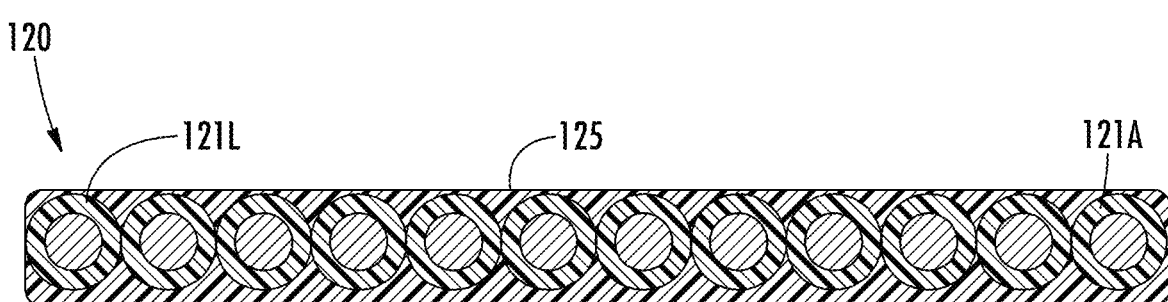
FIG. 12B is a cross-section view of the multi-fiber ribbon of FIG. 12A.

FIG. 12A is a top plan view of an end portion of a multi-fiber ribbon 120, and FIG. 12B is a cross-sectional view of the ribbon 120, which includes twelve optical fibers 121A-121L and a matrix 125 encapsulating the optical fibers 121A-121L. The optical fibers 121A-121L are substantially aligned relative to one another in a substantially planar relationship (e.g., as a one-dimensional array). By "substantially aligned," it is intended that the optical fibers 121A-121L are generally parallel with one another along the length of the ribbon 120. In certain embodiments, it is desirable for the optical fibers 121A-121L to not be displaced from a common plane by a distance of more than about one half the diameter of the optical fibers 121A-121L thereof. Although twelve optical fibers 121A-121L are shown in the ribbon 120, it is to be appreciated that any suitable number of two or more optical fibers may be employed to form optical fiber ribbons suitable for a particular use. Additionally, optical fibers in ribbons may be encapsulated by a matrix in any known configuration (e.g., edge-bonded ribbon, thin-encapsulated ribbon, thick-encapsulated ribbon, or multi-layer ribbon) according to conventional ribbon fabrication techniques.

In certain embodiments, a ribbon cable provides interconnection between optical fibers without requiring all fibers to be encapsulated. For example, a ribbon cable may encompass an array of multiple fibers that is temporarily joined by adhesive. The term "ribbon" may also refer to arrays of fibers that are loosely interconnected therebetween and may be rolled in two dimensions, such as ribbons interconnected by a "spiderweb" type of flexible inter-fiber binders. Additionally, a bare fiber array may be held by a fixture during fusion splicing without using any ribbonizing (e.g., encapsulating or adhesive) material between individual fibers.

Figure 13A:
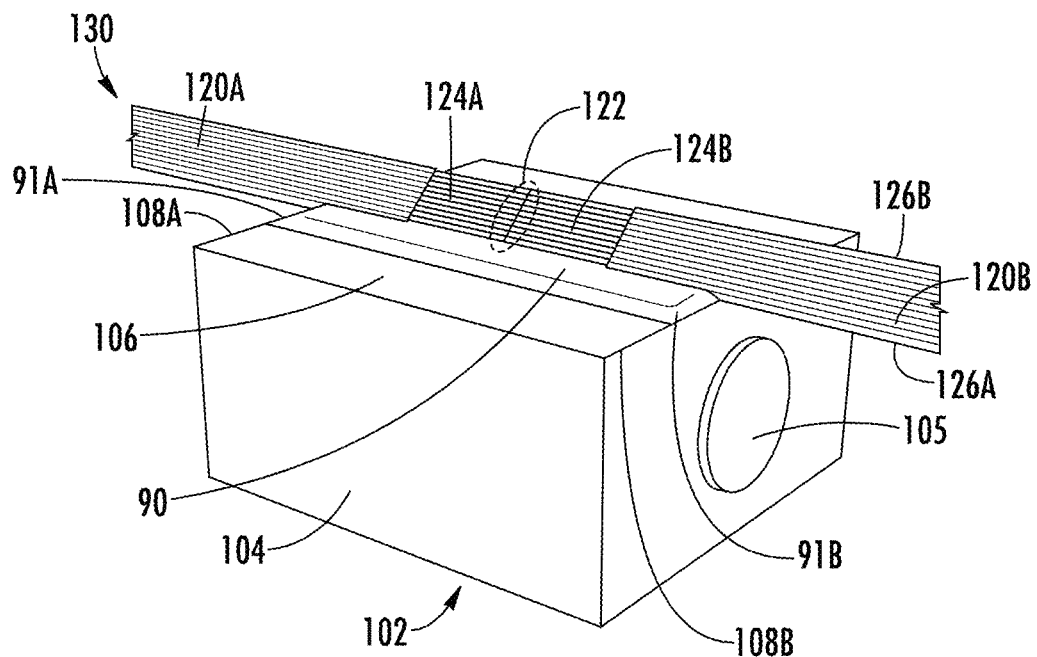
FIG. 13A is an upper perspective view illustration of a bare fusion spliced section of two multi-fiber ribbon segments forming a spliced ribbon cable, with a first lateral edge portion of the spliced ribbon cable submerged in a pool of molten thermoplastic material atop a substantially level, flat heated surface, and with the ribbon cable being tilted at an approximately forty-five degree angle during a ribbon cable insertion step, such that a second lateral edge portion of the spliced ribbon cable is arranged at a level above the first lateral edge portion.
Figure 13B:
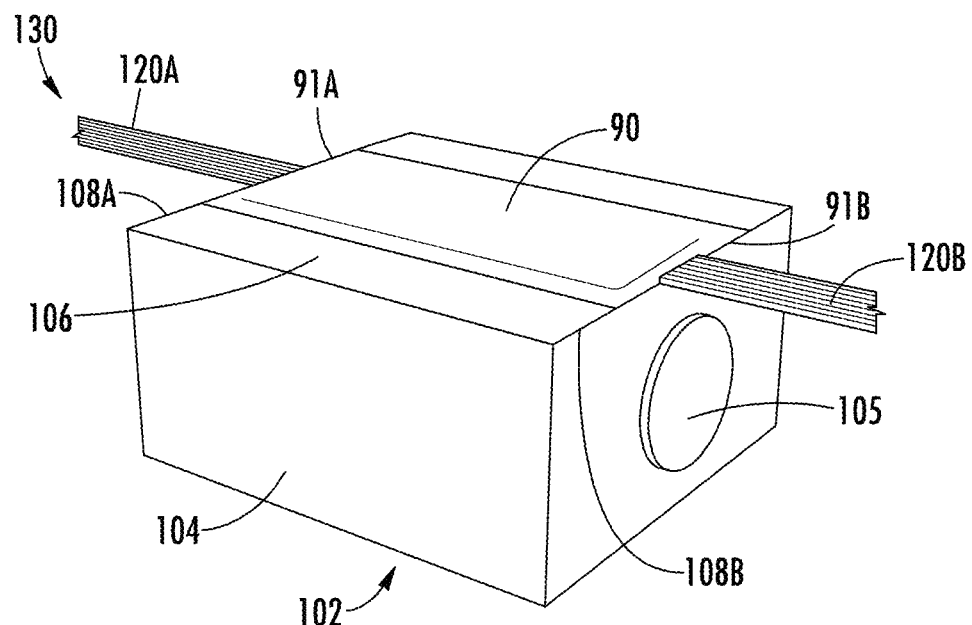
FIG. 13B illustrates the items of FIG. 13A, with the entire fusion spliced section of the spliced ribbon cable disposed in the pool of molten thermoplastic material atop the substantially level, flat heated surface, and with the first lateral edge portion being arranged at substantially the same horizontal level as the second lateral edge portion of the spliced ribbon cable.

Ribbon splices can be thermoplastically coated using apparatuses and method steps disclosed herein. For example, FIGS. 13A and 13B illustrate the same heating apparatus 102 as previously described in connection with FIGS. 9 and 10, but as applied to thermoplastically coat a fusion spliced section 130 of two optical fiber ribbons 120A, 120B. The heating apparatus 102 includes a body 104 that contains an internal electric cartridge heater 105. A pool of molten thermoplastic material 90 is arranged atop a substantially level, flat heated surface 106. Lateral edges 91A, 91B of the pool of molten thermoplastic material 90 extend to lateral edges 108A, 108B of the flat heated surface 106 without overflowing, due to lower temperature at the lateral edges 108A, 108B as well as surface tension of the molten thermoplastic material 90. FIG. 13A illustrates bare fusion spliced section 130 of two optical fiber ribbons 120A, 120B (including stripped sections 124A, 124B and a splice joint 122) arranged above the pool of molten thermoplastic material 90, with the splice joint 122 roughly centered above the pool, and with the length of the pool exceeding the combined length of the stripped sections 124A, 124B. As shown, a first side 126A of the fusion spliced section 130 of optical fiber ribbons 120A, 120B initially contacts the pool of molten thermoplastic material 90, while the second side 126B of the fusion spliced section 130 remains elevated above the pool. Thereafter, the remainder of the fusion spliced section 130 gradually tilts to a more horizontal orientation and is submerged into the pool, as shown in FIG. 13B. Such figure shows the stripped sections 124A, 124B and the splice joint 122 of the fusion spliced section 130 submerged in the pool of molten thermoplastic material 90. When the fusion spliced section 130 is in this submerged state, the thickest portion(s) of the optical fiber ribbons 120A, 120B (namely, pre-coated sections not corresponding to the stripped sections 124A, 124B) may be positioned against the flat heated surface 106 underlying the pool of molten thermoplastic material 90. Such positioning provides support to the fusion spliced section 130 and promotes even coverage of the optical fiber ribbons 120A, 120B with molten thermoplastic material 90.

In other embodiments, coating the fusion splice section 130 can be accomplished with an inclined (tilted), flat heated surface (e.g., using the heating apparatus 112 described in connection with FIG. 11). Additionally, although the technique mentioned above where the first side 126A of the fusion spliced section 130 is submerged into the pool of molten thermoplastic material 90 before the second side 126A may help reduce the potential for entrapment of air bubbles, in some embodiments the fusion spliced section 130 may be oriented parallel to the heated surface when being moved into the pool of molten thermoplastic material 90. Indeed, lift off techniques may be similar to those used for coating of single fiber splices.

Preferably, the optical fiber ribbons 120A, 120B are kept straight with slight tension (e.g., in a range of from about 0.1 N to about 10 N, or from about 0.4 N to about 4 N) during the entire coating process. Maintaining tension may desirably maintain substantial parallelism between the individual optical fibers (e.g., the optical fibers 121A-121L of FIG. 12B) of the optical fiber ribbons 120A, 120B. That is, because optical fibers of the optical fiber ribbons 120A, 120B are kept straight with slight tension during the entire coating process, the optical fibers remain parallel after the thermoplastic solidifies, thus removing any risks of fiber damaging or micro bending caused by fiber to fiber contacts or cross over. In contrast, if a splice protection layer were to be formed by UV adhesive over molding, the optical fibers would not be held under tension during coating, and the resulting molded ribbon splice may not maintain individual fibers in parallel orientation. The coated ribbon exhibits flexibility that is comparable to unprocessed fiber ribbon. The thickness of the overcoating layer is likewise controlled by the thickness of the molten thermoplastic material. In certain embodiments, the thickness (i.e., depth) of the pool of the molten thermoplastic material may be in a range of from about 0.5 mm to about 3.0 mm (or in a range of from about 0.2 mm to about 1 mm), and the thickness of the overcoating layer may be comparable to an unprocessed (uncoated) optical fiber ribbon.

In certain embodiments, the molten thermoplastic material fills gaps between optical fibers in each of the stripped sections 124A, 124B and immerses the fusion spliced section 130 in less than 5 seconds. If desired, only one side/surface of the unstripped optical fiber ribbons 120A, 120B may be depressed into contact with the molten thermoplastic material. Alternatively, a ribbon splice including optical fiber ribbons that are first coated on one side may be flipped for a second coating of the opposing side, so that both sides are overcoated with the same thickness of thermoplastic material.

Within the knowledge of the inventors, dip coating in molten thermoplastic material has not been previously used in the art for protecting fusion spliced optical fibers. It is believed that dip coating has not been previously considered due to the need to match the diameter of an original fiber coating for certain applications, and due to the relatively weak splice strength provided by fusion splicing of ends of fibers that were stripped by traditional mechanical stripping methods. As noted previously herein, mechanical stripping of fiber coating layers prior to fusion splicing typically generates flaws in (glass) optical fibers that can reduce their tensile strength. Owing to reduced tensile strength inherent to mechanical stripping techniques, solid strength members (e.g., associated with heat shrink protection sleeves) have been considered necessary to confer a fiber optic cable assembly with sufficient overall tensile strength for numerous end use applications. The embodiments shown in the preceding FIGS. 4A-13B each include a thermoplastic overcoating arranged over a fusion splice joint, but are each devoid of a conventional mechanical strength member such as a stainless steel rod. As used herein, "rod" broadly refers to a solid, elongate member of any cross-sectional shape (e.g., round, rectangular, c-shaped, etc.).

Figure 14:
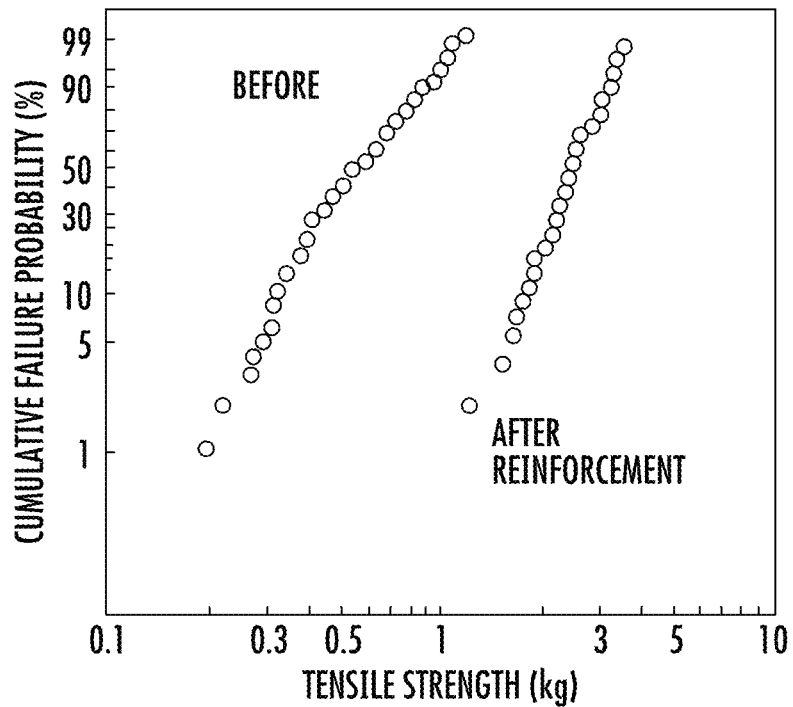
FIG. 14 provides tensile strength Weibull plots (embodying cumulative failure probability (percent) versus tensile strength (kg)) for optical fiber fusion splices before and after protection with conventional heat shrink protection sleeves, respectively, with the fiber splices joining optical fiber ends that were pre-stripped according to traditional (e.g., mechanical) stripping techniques.

The tensile strength-enhancing properties of reinforced heat shrink protection sleeves (i.e., those reinforced with solid strength members such as stainless steel rods as mentioned above) applied to fusion spliced optical fibers previously stripped by mechanical methods are apparent upon review of FIG. 14. FIG. 14 provides tensile strength Weibull plots (embodying cumulative failure probability (percent) versus tensile strength (kg)) for optical fiber fusion splices before and after protection with reinforced heat shrink protection sleeves, respectively, with the fiber splices joining optical fiber ends that were previously stripped according to traditional mechanical stripping techniques. The left series of data points shows that, for an unreinforced fusion splice section of optical fibers, the cumulative failure probability corresponding to 1 kg tensile strength (e.g., application of tension of 1 kg) exceeds 90 percent. Conversely, the right series of data points shows that an optical fiber fusion splice protected with a reinforced heat shrink protection sleeve has a cumulative failure probability on the order of about 1 percent corresponding to 1 kg tensile strength.

Figure 15:
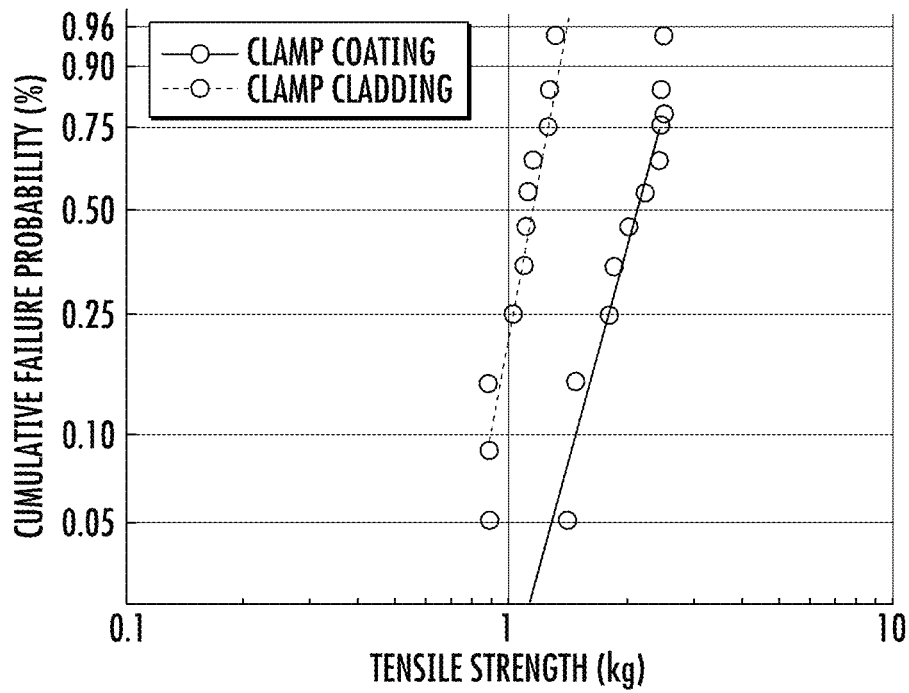
FIG. 15 provides tensile strength Weibull plots (embodying cumulative failure probability (percent) versus tensile strength (kg)) for unprotected optical fiber fusion splices joining optical fiber ends that were prepared by non-contact stripping, including fusion splices prepared with a clamp positioned on the fiber coating and fusion splices prepared with a clamp positioned on the fiber cladding, respectively.

The recent advent of high strength fiber stripping processes, such as the non-contact stripping process disclosed in the '626 Patent, have greatly improved the reliability of fusion spliced optical fibers. FIG. 15 provides tensile strength Weibull plots (cumulative failure probability (percent) versus tensile strength (kg)) for unprotected optical fiber fusion splices joining optical fiber ends that were prepared by stripping according to the '626 Patent, including fusion splices prepared with a clamp positioned on the fiber coating (at right in FIG. 15), and fusion splices prepared with a clamp positioned on the fiber cladding (at left in FIG. 15), respectively. If the fiber cladding is not touched during fiber preparation (e.g., stripping) and fusion splicing, then the minimum tensile strength of the resulting splice is comparable to that of a protected splice. The tensile strength of unprotected fusion splices may be further enhanced by optimizing the arcing condition of a fusion splicer and/or by using laser splicing. Thus, due to recent advancements, a solid strength member (such as incorporated into a heat shrink protection sleeve) is no longer necessary to provide adequate tensile strength if an appropriate high-strength fusion splicing process is used.

Overcoatings of solid thermoplastic material as disclosed above are flexible, in contrast to heat shrink protection sleeves with integrated strength members. For fiber component assemblies inside a fiber optic module or other fiber optic component, a splice region protected with an overcoating of solid thermoplastic material as disclosed herein (which exhibits flexibility consistent with the rest of the fiber or cable) may be more advantageous than a conventional heat shrink protection sleeve (which must be managed in a splice tray).

While flexible splice protection is viable for applications where fiber bending radius is large, for component or cable assembly applications requiring permanent tight bends, flexible splice protection is challenged by the inherent high stress due to bending. The design rule for fibers to achieve 20 years of service life is to operate at a stress level below one fifth of the proof test stress level. Limited by the fiber preparation process and the gripping force of the fiber holders, fusion splicers typically proof test a splice only at 50 kpsi. For most applications that cannot afford the use of high strength fusion splicing, keeping the splice region straight through use of an integrated strength member is the most practical solution.

The Background section of this document identifies various limitations associated with conventional heat shrink protection sleeves having integrated strength members. Building on the disclosure herein of flexible splice protection apparatuses incorporating overcoatings of high temperature melt flow thermoplastic materials, additional embodiments of the present disclosure utilize a secondary process that reinforces a thermoplastically overcoated splice region by either (i) adhering a strength member (e.g., a small diameter stainless steel rod, optionally embodied in another shape and/or suitably stiff material) to the thermoplastically overcoated splice region, using thermoplastic adhesive material, or (ii) applying a thicker secondary layer of thermoplastic adhesive material (which may be the same as or compositionally different from the thermoplastically overcoated splice region). Such reinforcement methods do not utilize a heat shrink sleeve.

The secondary process leverages the dynamic adhesion properties of melt flow thermoplastic material. In an example involving reinforcement with a strength member, the pre-coated splice region may be used to rapidly swipe a strength member along with a portion of molten thermoplastic material from the heated surface, and the bonding to the strength member may be completed in a very short time without special tooling. In certain embodiments, the strength member comprises a length exceeding a combined length of the stripped sections of the first and second optical fibers and spans across the splice joint. Optionally, a cooling device may be used to quickly solidify the thermoplastic material in the reinforced region.

As mentioned above, as an alternative to adhering a prefabricated strength member to a pre-coated splice region, an enhanced thickness region of additional thermoplastic material (which may be compositionally different from the initial solid thermoplastic overcoating) may be used as reinforcement. In certain embodiments, an enhanced thickness region may be embodied in a secondary overcoating that is thicker than a first or initial overcoating. In certain embodiments, an enhanced thickness region has a greater thickness than an average thickness of a first or initial solid thermoplastic overcoating. To form the secondary overcoating, a thermoplastically overcoated fusion splice assembly may be brought into contact with a pool of molten thermoplastic adhesive material supported by a heated surface, and a large amount of the molten thermoplastic adhesive material may be swiped away from the heated surface. The molten thermoplastic adhesive material may rapidly cooled and solidified to stiffen the splice region. In certain embodiments, the additional thermoplastic material may extend around less than an entire perimeter of the splice region in a direction transverse to the longitudinal direction. In certain embodiments, the additional solid thermoplastic material spans across the splice joint, and comprises a center of mass that is laterally offset relative to the stripped sections of the first and second optical fibers. In this regard, the additional solid thermoplastic material is qualitatively different from a hypothetical secondary heat-shrink sleeve that would be radially centered around a splice joint. In certain embodiments, a diameter of the thermoplastic adhesive reinforced region may be in a range of from about 1 mm to about 3 mm; however, reinforcements with larger dimensions may be used. When a fusion spliced assembly is coiled to a tight diameter (e.g., 1 inch or about 2.5 cm), the thermoplastic adhesive reinforced region will remain relatively straight.

Reinforcing a splice region to maintain its straightness is critical for reliability when an optical fiber needs to be coiled in a tight space, such as in hardware (e.g., a module or cassette) or cable assembly applications. The process outlined above permits a strength member or enhanced thickness region to be added without requiring use of a heat shrink sleeve, and without relying on complicated processes such as overmolding and epoxy encasing. Avoiding use of a heat shrink sleeve allows the reinforcement process and resulting product to overcome limitations associated with existing heat shrink splice protectors. Methods according to this disclosure for sleeveless splice protection, which complement the above-described flexible thermoplastic splice overcoating methods, may entail faster cycle time, lower cost, and allow for more compact packaging of the splices. Such methods may also provide significant advantages relative to other conventional splice reinforcement methods such as overmolding and epoxy potting.

Figure 16:
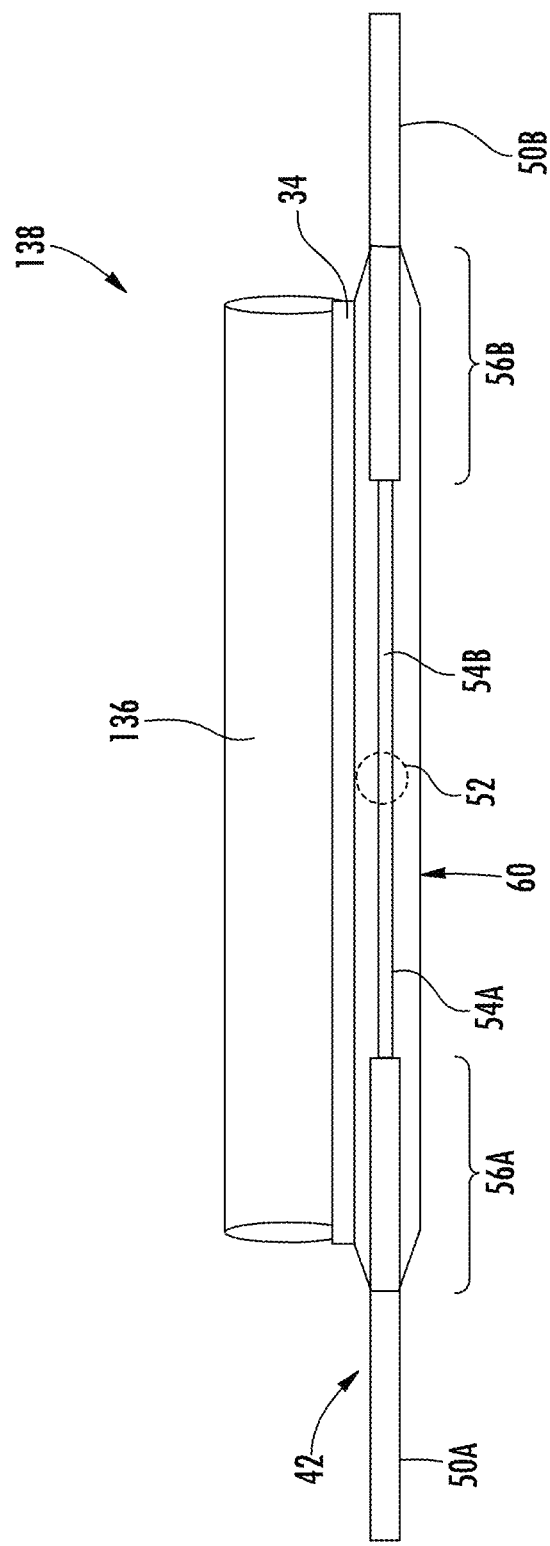
FIG. 16 is a side elevation view illustration of a sleeveless reinforced fusion spliced section of optical fibers including a solid overcoating of thermoplastic material over stripped sections of the first and second optical fibers, a splice joint, and pre-coated sections of the first and second optical fibers, with a solid strength member adhered to an external portion of the thermoplastic material using melt flow thermoplastic material to form a sleeveless reinforced splice assembly.
Figure 17:
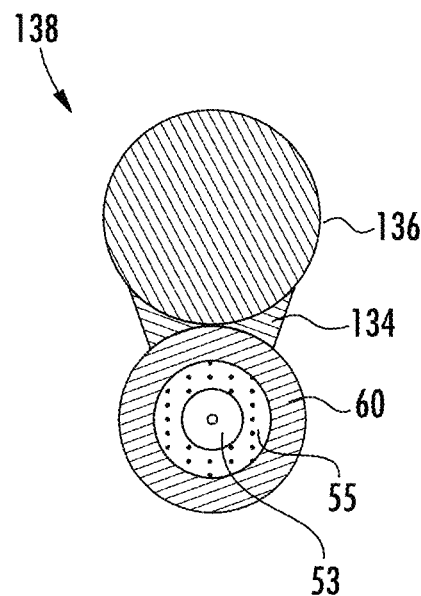
FIG. 17 is a cross-sectional view of the sleeveless reinforced splice assembly of FIG. 16.

FIG. 16 illustrates a fusion spliced section 42 of two optical fibers 50A, 50B that is reinforced using a solid strength member 136. In particular, the strength member 136 is adhered to a thermoplastic overcoating 60 surrounding a splice joint 52 between stripped sections 54A, 54B of the optical fibers 50A, 50B, to form a reinforced splice assembly 138 that is devoid of a sleeve. Each optical fiber 50A, 50B includes a coating, with portions of each optical fiber 50A, 50B being previously stripped of such coating to form stripped sections 54A, 54B embodying glass cladding. Ends of the stripped sections 54A, 54B are fusion spliced to form the splice joint 52. The solid overcoating 60 of thermoplastic material extends over the splice joint 52, the previously stripped sections 54A, 54B, and short lengths 56A, 56B of the coated optical fibers 50A, 50B. The solid strength member 136 is adhered to the thermoplastic overcoating 60 via a thermoplastic bonding material 134 that is configured to flow when melted. Notably, the material of the thermoplastic overcoating 60 does not encircle an entire perimeter of the strength member in a direction transverse to a longitudinal direction as a tubular sleeve would. Instead, the additional thermoplastic material may be adhered to only a portion of a strength member. FIG. 17 is a cross-sectional view of the sleeveless reinforced splice assembly 138 of FIG. 16, showing the solid strength member 136 being adhered to an exterior portion of the thermoplastic overcoating 60 via the thermoplastic bonding material 134. FIG. 17 also shows the thermoplastic overcoating 60 as surrounding a fiber coating 55 and glass cladding 14 of an optical fiber. In certain embodiments, the thermoplastic bonding material 134 may be compositionally the same or compositionally different relative to the material of the thermoplastic overcoating 60. In certain embodiments, the thermoplastic bonding material 134 may have a greater elastic modulus than the material of the thermoplastic overcoating 60. Preferably, the solid strength member 136 has a length at least a long as the combined length of the stripped sections 54A, 54B of the optical fibers 50A, 50B. In certain embodiments, the solid strength member 136 may have a diameter that is at least as large as a combined diameter of the fusion spliced section 42 and the thermoplastic overcoating 60.

To fabricate the reinforced splice assembly 138, ends of the optical fibers 50A, 50A may be stripped of primary and secondary coatings to form the stripped sections 54A, 54B (e.g., with typical strip lengths of about 5 mm), with ends thereof being cleaned and cleaved before being joined together in a fusion splicer to form the fusion spliced section 42. Thereafter, the fusion spliced section 42 may be rapidly coated with high temperature melt flow thermoplastic material to form the thermoplastic overcoating 60 (e.g., using one of the techniques according to this disclosure), typically resulting in formation of a conformal overcoating over the stripped sections 54A, 54B and extending over short lengths 56A, 56B of the coated optical fibers 50A, 50B. The overcoating process may be completed in as fast as about three seconds. Following formation of the thermoplastic overcoating 60, the solid strength member may be added in multiple ways, as discussed hereinafter.

In certain embodiments, the thermoplastically coated fusion spliced section 42 may be placed parallel with and proximate to the strength member 136, and the molten thermoplastic bonding material 134 may be dispensed to bond the strength member 136 to a portion of the thermoplastic overcoating 60. In certain embodiments, the dispensing process may be executed with a three-dimensional printer or other suitable means for dispensing molten polymeric material. In another embodiment, the thermoplastically coated fusion spliced section 42 may be placed in contact with the strength member 136, and rapidly heated above the softening temperature of the thermoplastic overcoating 60 to cause the thermoplastic material to reflow and contact the strength member 136, thereby bonding the thermoplastic overcoating 60 to the strength member 136. Optionally, at least a portion of the strength member 136 may be precoated with a thermoplastic adhesive material to ensure that sufficient thermoplastic material is provided to maintain thermoplastic encasement of the fusion spliced section 42. The foregoing two embodiments may be performed by setting the thermoplastically overcoated fusion spliced section 42 in a fixture before dispensing additional thermoplastic adhesive material or by reflowing existing thermoplastic adhesive on the fusion spliced section 42. A more rapid coating method is discussed hereinafter in conjunction with FIGS. 19A-19C.

Figure 18:
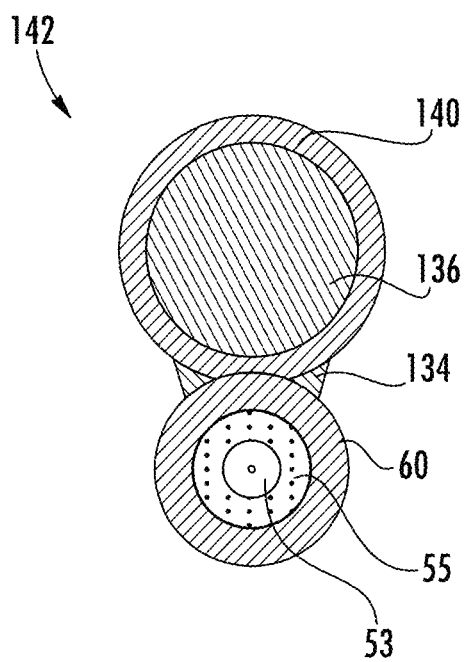
FIG. 18 is a cross-sectional view of a sleeveless reinforced splice assembly similar to that shown in FIG. 17, but with the solid strength member being pre-coated with melt flow thermoplastic material.

FIG. 18 is a cross-sectional view of a reinforced splice assembly 142 that is devoid of a sleeve and similar to the reinforced splice assembly 138 of FIG. 16, but with the solid strength member 136 being pre-coated with melt flow thermoplastic material 140 prior to the adhesion of the solid strength member 136 to the thermoplastic overcoating 60 via thermoplastic bonding material 134. FIG. 18 also shows the thermoplastic overcoating 60 as surrounding a fiber coating 55 and glass cladding 14 of an optical fiber.

Figure 19A:
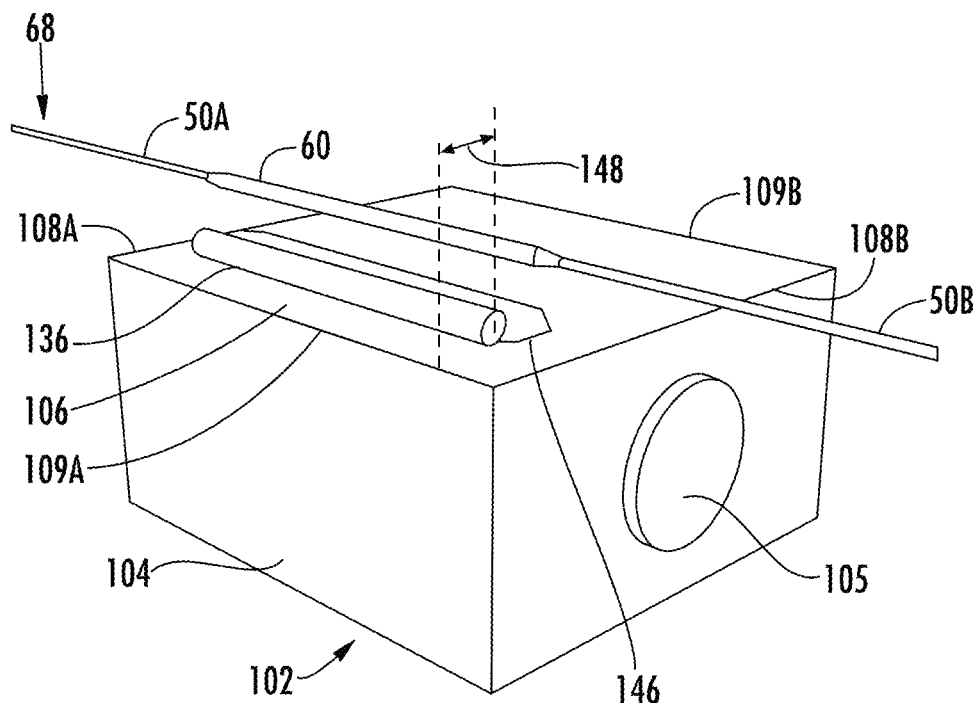
FIG. 19A is an upper perspective view illustration of a thermoplastically overcoated fusion spliced section of optical fibers arranged above a pool of molten thermoplastic material supported by a substantially flat, level heated surface, with a solid strength member being positioned at one edge of the pool in preparation for adhesion to the overcoated fusion spliced section of optical fibers.
Figure 19B:
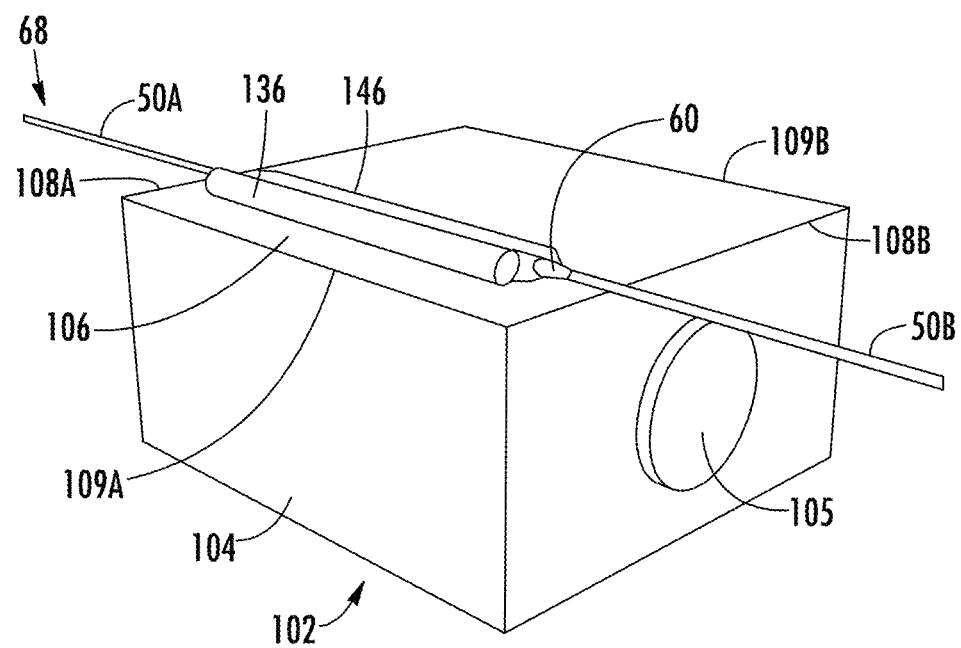
FIG. 19B illustrates the items of FIG. 19A following relative movement between the overcoated fusion spliced section of optical fibers and the heated surface to place the overcoated fusion spliced section of optical fibers into the pool of molten thermoplastic material proximate to the solid strength member.
Figure 19C:
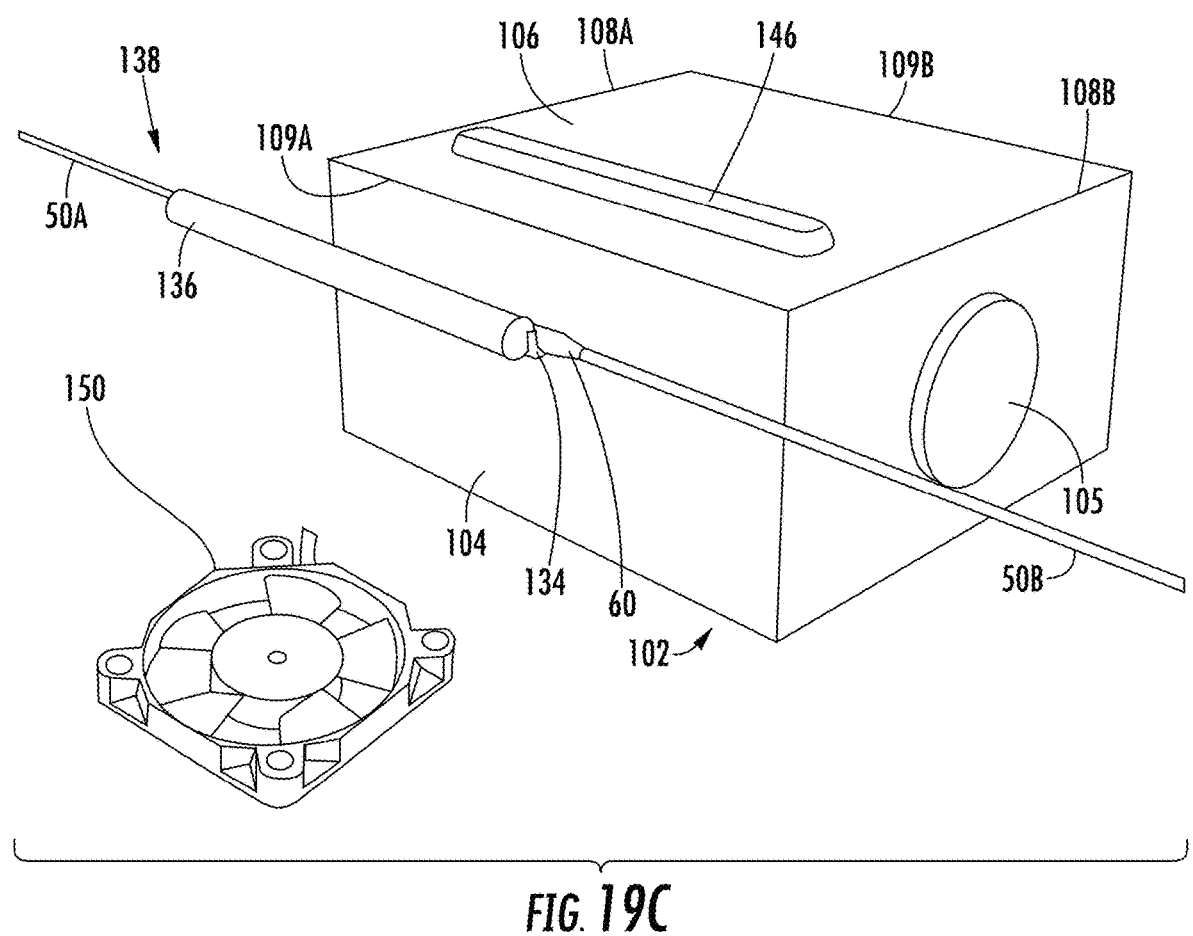
FIG. 19C illustrates the items of FIG. 19B, with addition of a cooling fan, following adhesion between the solid strength member and the overcoated fusion spliced section of optical fibers, and following relative movement between the reinforced fusion spliced section and the heated surface to position the reinforced fusion spliced section proximate to the cooling fan.

FIGS. 19A-19C illustrate a heating apparatus (i.e., the same heating apparatus 102 as previously described in connection with FIGS. 9, 10, 13A, and 13B) and steps that may be employed in a method for fabricating a reinforced splice assembly with a solid strength member adhered to a thermoplastically overcoated fusion spliced section of optical fibers. The heating apparatus 102 includes a body 104 that contains an internal electric cartridge heater 105. The body includes lateral edges 108A, 108B as well as front and rear edges 109A, 109B. As shown, a pool of molten thermoplastic adhesive material 146 is arranged atop a substantially level, flat heated surface 106, positioned generally closer to the front edge 109A than the rear edge 109B. Edges of the pool of molten thermoplastic adhesive material 146 may or may not extend to lateral edges 108A, 108B of the flat heated surface 106.

FIG. 19A illustrates a thermoplastically overcoated fusion spliced section 68 of optical fibers 50A, 50B bearing a thermoplastic coating 60 over a central portion thereof, with the thermoplastically overcoated fusion spliced section 68 being aligned with (but not in contact with) the strength member 136 from above 106. Coming from an initial coating step to form the thermoplastic coating 60, the thermoplastically overcoated fusion spliced section 68 may continue to be held straight without needing to be retained in a fixture, but the thermoplastically overcoated fusion spliced section 68 is preferably at an ambient or near-ambient temperature (e.g., approximately 25° C.). The solid strength member 136 is supported by the flat heated surface 106, between the front edge 109A of the heating apparatus 102 and the pool of molten thermoplastic adhesive material 146. The cartridge heater 105 may be set to maintain the temperature of the flat heated surface 106 at an operating (melting) temperature of the molten thermoplastic adhesive material 146. Preferably, at least a portion of the solid strength member 136 is at least partially wetted by molten thermoplastic adhesive material 146 from the pool. In certain embodiments, the solid strength member 136 may positioned generally parallel and proximate to the front edge 109A, by a distance 148 of no greater than about 15 mm, no greater than about 10 mm, or no greater than about 5 mm. In certain embodiments the pool of molten thermoplastic adhesive material 146 may be at least as long as the overall length of the strength member 136.

FIG. 19B illustrates the same elements shown in FIG. 19A, following relative movement between the thermoplastically overcoated fusion spliced section 68 of optical fibers 50A, 50B and the flat heated surface 106 to place the thermoplastically overcoated fusion spliced section 68 of optical fibers 50A, 50B into the pool of molten thermoplastic adhesive material 146 proximate to the solid strength member 136, and preferably in contact with the heated surface 106. For example, the overcoated fusion spliced section 68 may be rapidly dipped into the molten thermoplastic adhesive material 146 while positioning the overcoated fusion spliced section 68 adjacent to the solid strength member 136. Such positioning causes the thermoplastic overcoating 60 of the overcoated fusion spliced section 68 to contact the molten thermoplastic adhesive material 146 and the solid strength member 136. Because the overcoated fusion spliced section 68 has much lower temperature than the molten thermoplastic adhesive 146 at the time of contact, the thermoplastic adhesive 146 immediately surrounding the overcoated fusion spliced section 68 is transiently cooled down with increased bonding force. Then without any delay, the overcoated fusion spliced section 68 swipes the solid strength member 136 along with part of the thermoplastic adhesive 146 away from the heated surface 106, as shown in FIG. 19C.

FIG. 19C illustrates generally the same elements shown in FIG. 19B, with addition of a cooling fan 150 proximate to (e.g., about 2.5 cm laterally away from) the front edge 109A of the body 104 of the heating apparatus 102. FIG. 19C also shows a state following adhesion between the solid strength member 136 and the thermoplastic overcoating 60 of the thermoplastically overcoated fusion spliced section 68 of optical fibers 50A, 50B to form a reinforced fusion spliced section 138. Additionally, FIG. 19C shows a state following relative movement between the reinforced fusion spliced section 138 and the body 104 to position the reinforced fusion spliced section 138 proximate to the cooling fan 150 to promote rapid cooling of the thermoplastic bonding material 134 (received from the pool of molten thermoplastic adhesive material 146). Because the overcoated fusion spliced section 68 and the solid strength member 136 are suspended in midair and have little thermal lass, fast cooling is promoted. Thus, as the solid strength member 136 is swiped away from the heated surface 106, reinforced fusion spliced section 138 moves to intercept the air flow and very quickly the thermoplastic adhesive 146 is solidified to complete the reinforcement bonding process. The steps shown in FIGS. 19A-19C can be completed in less than three seconds, with the fusion spliced section 68 of optical fibers 50A, 50B being held straight during the entire process, thereby preventing micro-bending of the fiber as the reinforced fusion spliced section 138 cools down.

In certain embodiments, the thermoplastic adhesive material 146 exhibits good adhesion to both the material of the solid strength member 136 and to the material of the thermoplastic overcoating 60. In certain embodiments, the thermoplastic adhesive material 146 may have a softening temperature that is slightly lower than that of the thermoplastic overcoating 60, but a softening temperature that is sufficiently high to ensure reinforcement performance throughout the target operating temperature range of −40° to 85° C. for optical fiber products.

In certain embodiments, the thermoplastic adhesive material 146 itself can serve as a strength member using substantially the same swiping process, without inclusion of a separate (e.g., stainless steel) solid strength member. Since thermoplastic material may deform near 85° C., in certain embodiments fillers known in the art may be added to the thermoplastic adhesive to improve its stiffness, thereby eliminating the need for a separate strength member.

Notably, when thermoplastic adhesive material (either itself embodying a strength member, or optionally in combination with a solid strength member) is used to reinforce a fusion spliced section of optical fibers, the strength member may be removed when desired by reheating the splice region without damaging the fiber splice, thereby permitting the type of splice reinforcement to be reconfigured if desired. This is in contrast to heat shrink protection sleeves that irreversibly bond a spliced fiber to a rod-like strength member, without permitting the flexibility to reconfigure the type of splice reinforcement.

As compared to use of conventional heat shrink protection sleeves, technical benefits of thermoplastic overcoating splice protection methods disclosed herein include (but are not limited to): lower material cost, faster splice protection, faster component assembly, and smaller component size. Methods and cable assemblies disclosed herein may be beneficially deployed with spliced optical fibers for use in fiber optic hardware (e.g., components such as modules and cassettes), as well as in other end uses such as overcoating of fibers for use with fiber sensors.

With further comparison to conventional heat shrink protection sleeves, sleeveless splice overcoating and reinforcement methods are distinctly different from methods employing conventional heat shrink sleeves. Overcoating and external strength member adhesion processes disclosed herein do not require threading a component (e.g., a heat shrink sleeve) over a fiber before fusion splicing, and do not require a sleeve to be slid over a splice region after fusion splicing. Sleeveless overcoating and external strength member adhesion processes use simple materials such as thermoplastic adhesive and stainless steel rods, resulting in significant cost savings compared to heat shrink sleeves. The process cycle time is also significantly faster, thereby reducing labor costs to protect and reinforce fiber splices.

In a further aspect of the disclosure, an apparatus for applying a thermoplastic coating over fusion spliced optical fibers includes a multiple support surfaces of different lengths and configured to support multiple pools of molten thermoplastic material, and a heating element (e.g., a resistive heating element, such as an electric cartridge heater) configured to heat the multiple support surfaces. In addition to applying thermoplastic coatings, an apparatus may also be used to promote bonding of a strength material (e.g., stainless steel rod or secondary thermoplastic overcoating) to an overcoated fusion spliced section. Such an apparatus may further include a body structure that is arranged between the support surfaces and the heating element, and that is configured to conduct heat from the heating element to the support surfaces. A controller may be configured to control the heating element to maintain the at least one support surface at a temperature sufficient to maintain the molten thermoplastic material in a viscosity range of from about 100 cps to about 10,000 cps. Although support surfaces of various shapes and conformations may be used (e.g., recessed, partially recessed, level planar, or inclined planar), in certain embodiments the support surfaces may be configured to permit fusion splices to be overcoated while fusion splice regions are maintained in a straight configuration. The presence of multiple support surfaces of different lengths may permit fusion spliced sections (of optical fibers) having different lengths to be overcoated with appropriate coating lengths. Moreover, the presence of multiple support surfaces (whether of the same or different lengths) may permit multiple fusion spliced sections to be overcoated simultaneously.

Figure 20A:
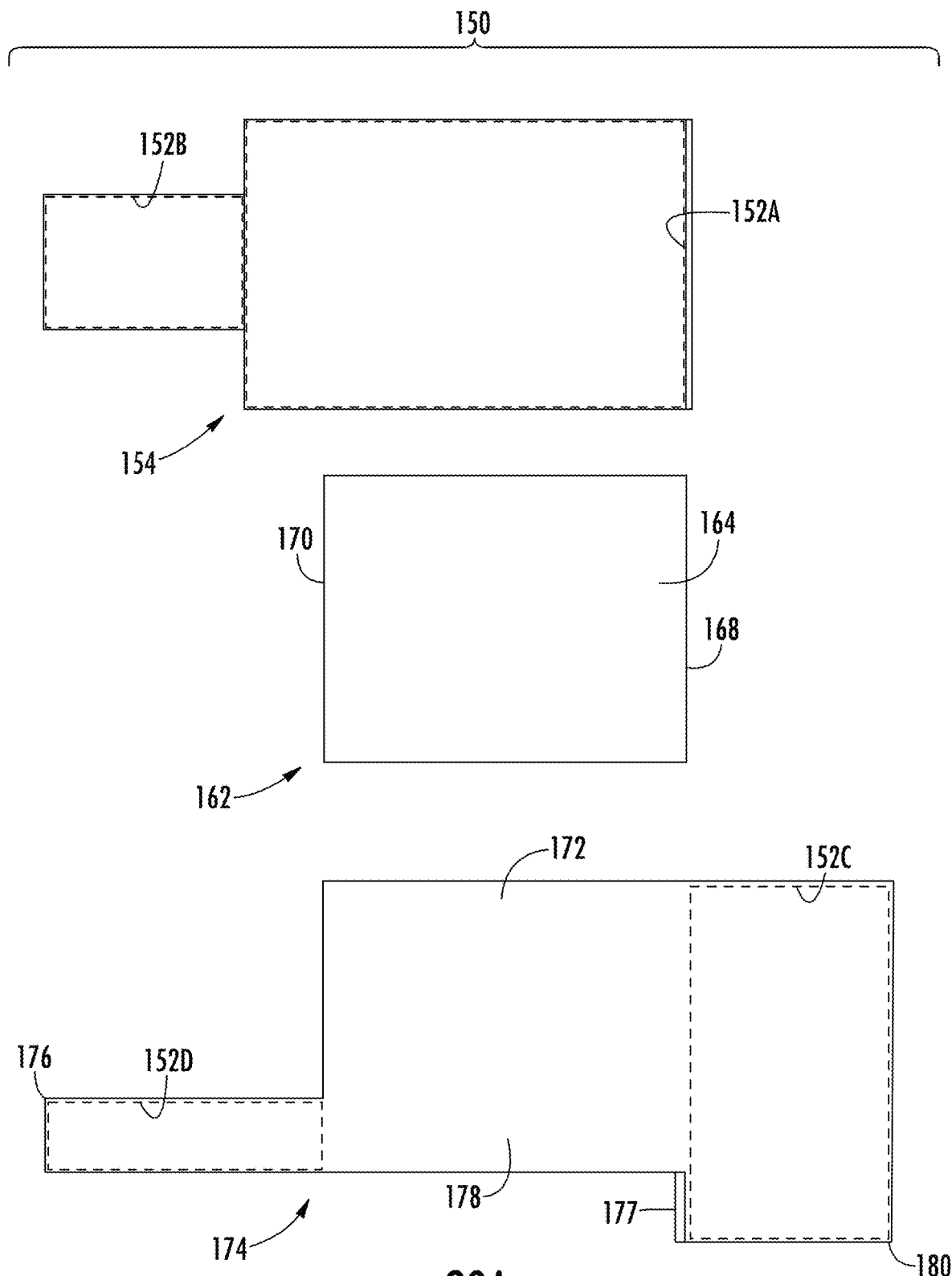
FIG. 20A is a top plan, partial assembly view illustration of three portions of a multi-surface heating apparatus suitable for supporting multiple pools of thermoplastic material in a molten state to permit thermoplastic overcoating of one or more of fusion spliced optical fiber sections.
Figure 20B:
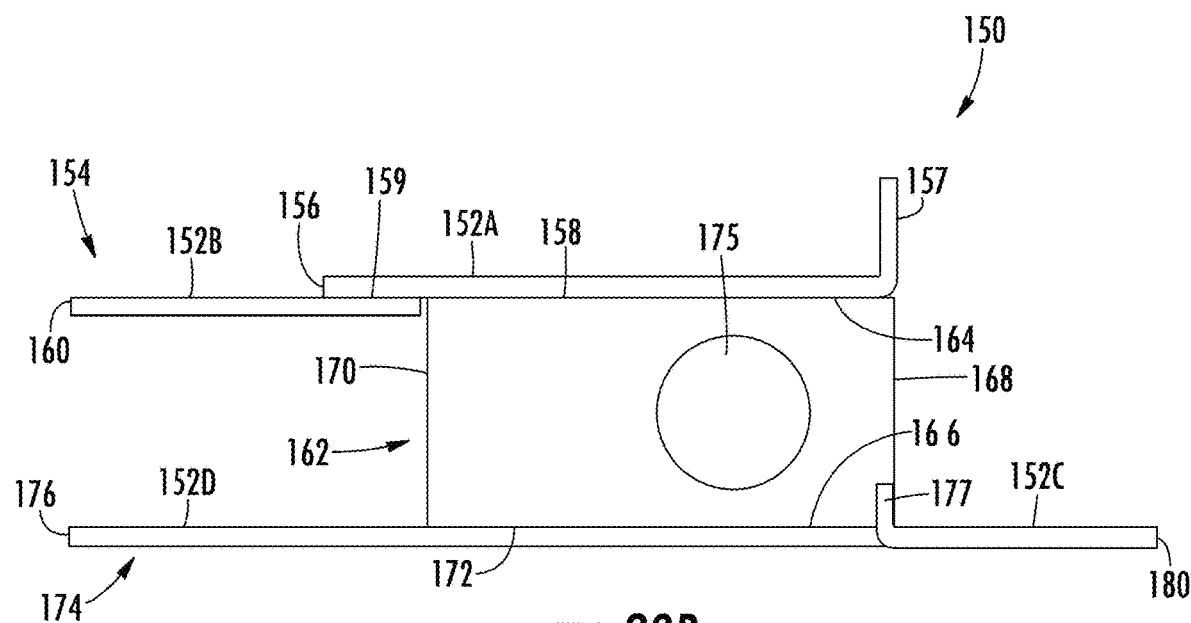
FIG. 20B is a front elevation view illustration of the multi-surface heating apparatus in an assembled state.

An exemplary multi-surface heating apparatus 150 including multiple support surfaces 152A-152D suitable for supporting multiple pools of thermoplastic material in a molten state is illustrated in FIGS. 20A and 20B. FIG. 20A is a top plan, partial assembly view illustration of three portions (namely, an upper support surface subassembly 154, a central body structure 162, and a lower support surface subassembly 174) of the multi-surface heating apparatus 150, and FIG. 20B is a front elevation view illustration of the multi-surface heating apparatus 150 in an assembled state. The upper support surface subassembly 154 includes first and second plates 156, 160 that are affixed to one another at a joint 159, with the second plate 156 being arranged at a level below the first plate 160. The first plate 156 may optionally be inclined away from level, and is bounded along one edge by a vertically upstanding border wall 157 (or an elevated lip), which may be used to retain molten thermoplastic from spilling. The vertically upstanding border wall 157 is registered with a first lateral surface 168 of the central body structure 162, with the first lateral surface 168 opposing a second lateral surface of the central body structure 162. The first support surface 152A is defined by an upper surface of the first plate 156, and the second support surface 152B is defined by an upper surface of the second plate 160. The central body structure 162 includes an upper surface 164 arranged to abut a lower surface 158 of the first plate 156, and includes a lower surface 166 arranged to abut an upper surface 178 of a central portion 172 of the lower support surface subassembly 174. The lower support surface subassembly 174 includes a wide laterally projecting portion 180 and a narrow laterally projecting portion 176, wherein an upper surface of the wide laterally projecting portion 180 defines the third support surface 152C, and an upper surface of the narrow laterally projecting portion 176 defines the fourth support surface 152D. A vertically upstanding wall portion 177 (or an elevated lip) is arranged proximate to an edge of the wide laterally projecting portion 180, registered with the first lateral surface 168 of the central body structure 162. The central body structure 162 contains an internal cartridge heater 175. As shown, the four support surfaces 152A-152D have different lengths of 20 mm, 10 mm, 30 mm, and 5 mm, respectively.

Figure 20C:
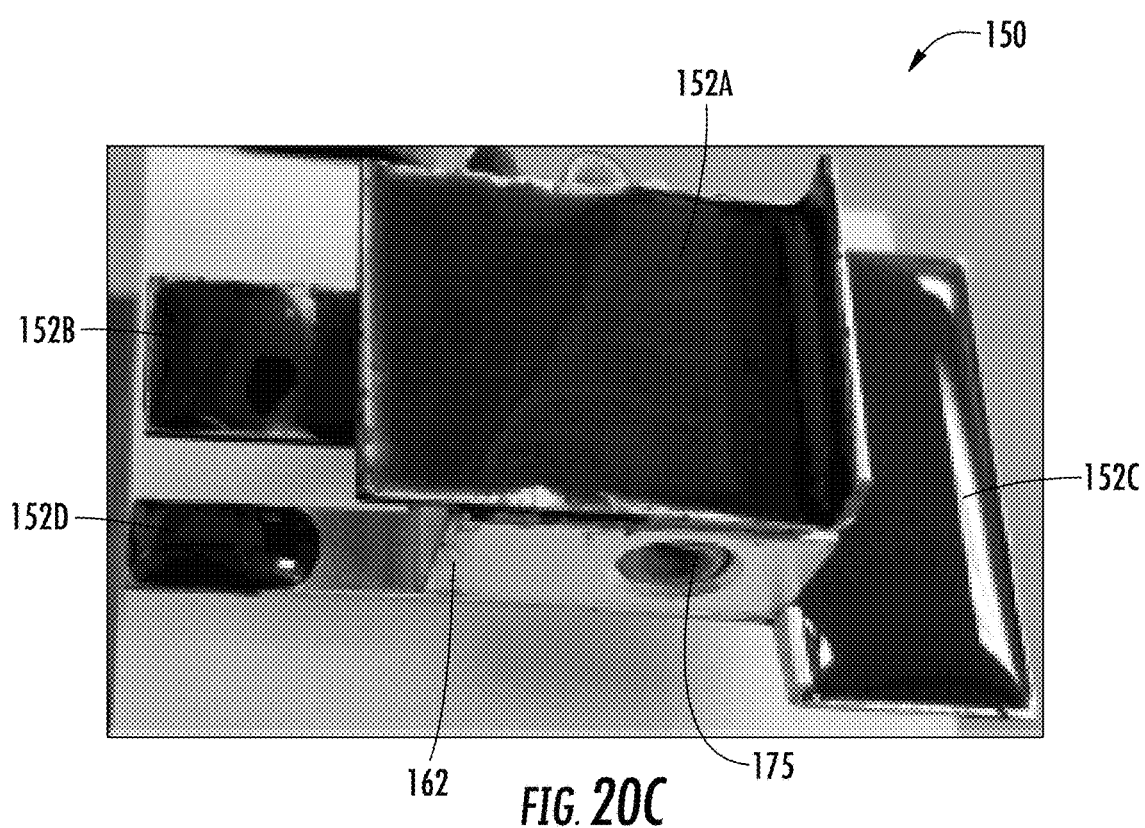
FIG. 20C is an upper perspective view photographic image of a multi-surface heating apparatus according to the design shown in FIGS. 20A and 20B, showing four heated surfaces of different lengths each supporting a different volume pool of molten thermoplastic material.

FIG. 20C is an upper perspective view photographic image of a multi-surface heating apparatus according to the design shown in FIGS. 20A and 20B, showing four heated surfaces 152A-152D of different lengths each supporting a different volume pool of molten thermoplastic material, and showing a cartridge heater 175 arranged within an interior of the central body structure 162.

Further aspects of the disclosure may be understood by review of the following non-limiting examples, which are provided to illustrate exemplary implementations without purporting to encompass all possible variations that would be apparent to one skilled in the art upon review of the present disclosure.

Example 1

Segments of two 900 µm buffered optical fibers were prepared for fusion splicing by stripping coating layers from ends thereof, and thereby exposing bare glass at the ends, using a non-contact stripping method according to the '626 Patent. More specifically, a 900 µm buffer layer was stripped from the end of each optical fiber using mechanical stripping techniques to expose a 250 µm coated section of each optical fiber. A portion of each 250 µm coated section was then stripped using a non-contact stripping method according to '626 Patent, thereby leaving some 250 µm coated section and some bare glass section of each optical fiber exposed. Stripped ends of the two segments were fusion spliced together utilizing a conventional method to form a fusion spliced segment. The fusion spliced segment was then subject to overcoating with TECHNOMELT® Supra 400 Cool thermoplastic material (Henkel Corp., Dusseldorf, Germany), which is commonly used as a melt flow adhesive for packaging applications and has a softening point of 92° C. The material is polyolefin-based and is highly water resistant. Although conventional heat shrink protection sleeves also utilize an inner layer of polyolefin materials, such materials are understood to have a higher molecular weight and a much higher viscosity than TECHNOMELT® Supra 400 Cool thermoplastic material, thereby necessitating the use of outer heat shrink tubing layers with heat shrink protection sleeves. A metal substrate defining a reservoir of a shape consistent with the reservoir 44 shown in FIG. 4A was heated on a temperature-controlled hot plate to elevate the temperature of the TECHNOMELT® Supra 400 Cool thermoplastic material (forming a pool within in the reservoir) to a temperature of 135° C. At such temperature, the thermoplastic material was molten and exhibited a viscosity of about 1000 cps. A central portion of the fusion spliced segment (including the entire bare glass fiber region as well as short lengths of coated fiber proximate to the bare glass fiber region) was allowed to bow downward into the molten thermoplastic material so that the bare glass fiber region was completely immersed therein. The length of the bare glass fiber region was about 15 mm. Following such immersion, the fusion spliced segment was withdrawn upward from the pool of molten thermoplastic material at an approximately uniform rate, and the molten thermoplastic material cooled rapidly (e.g., within a few seconds) to form a solid thermoplastic overcoating over the previously immersed portion of the fusion spliced segment.

Figure 21A:
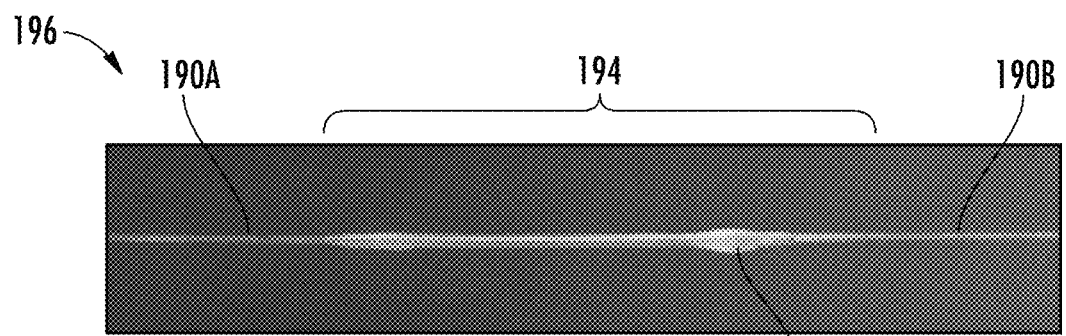
FIG. 21A is a photographic image of a fusion spliced section of optical fibers with an overcoating of a solid thermoplastic material (TECHNOMELT® Supra 400 Cool thermoplastic material, Henkel Corp., Dusseldorf, Germany) applied by dip coating of the fusion spliced section in a pool of molten thermoplastic material.
Figure 21B:
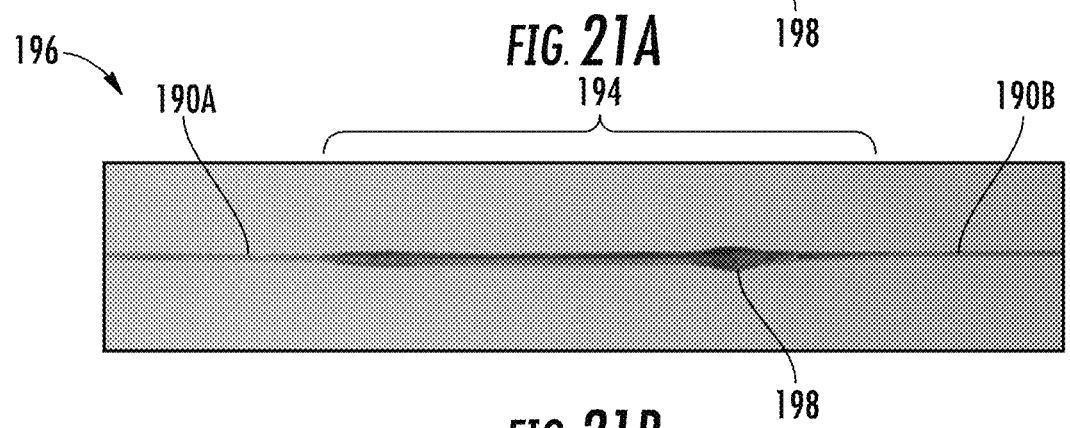
FIG. 21B is a color inverted reproduction of the image shown in FIG. 21A.

FIG. 21A is a photographic image of a fusion spliced section 196 of optical fibers 190A, 190B with an overcoating 194 of solid thermoplastic material (having a diameter of about 0.5 mm) obtained by the foregoing method. As shown at right in FIG. 21A, a localized excess thickness region 198 of the overcoating 194 of solid thermoplastic material was formed. FIG. 22B is a color inverted reproduction of the image shown in FIG. 21A, provided to enhance visibility of certain features.

Figure 22A:
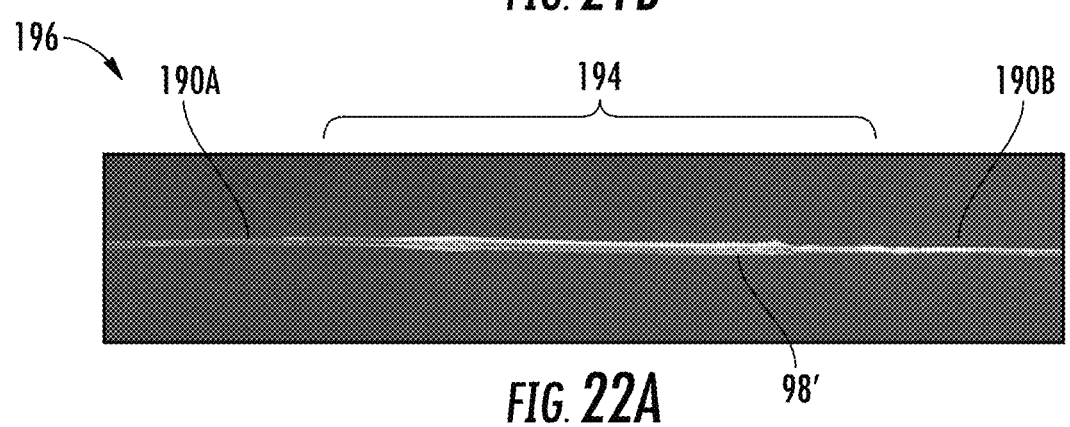
FIG. 22A is a photographic image of the fusion spliced section of optical fibers of FIG. 21A following thinning of a portion of the solid thermoplastic material coating by local contact with a heated surface.
Figure 22B:
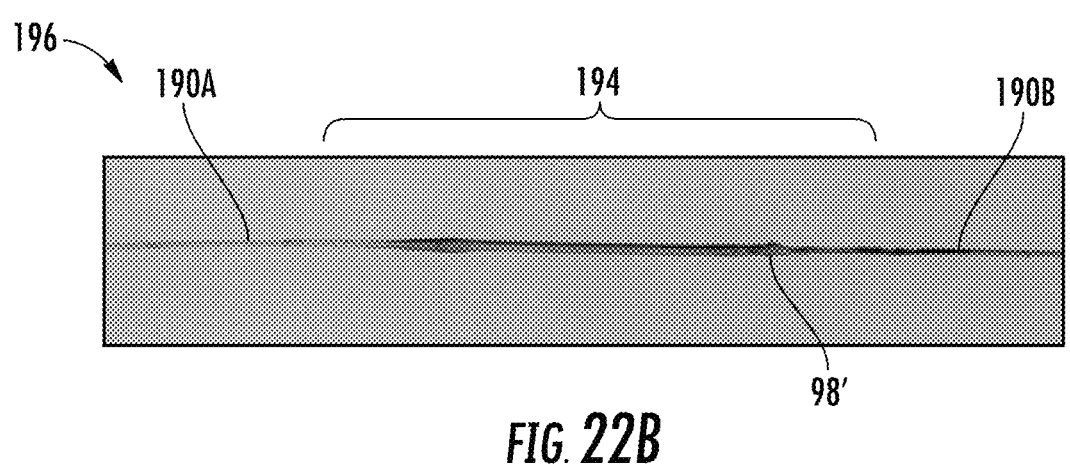
FIG. 22B is a color inverted reproduction of the image shown in FIG. 22A.

FIG. 22A is a photographic image of the fusion spliced section 196 of optical fibers 190A, 190B of FIG. 21A following thinning of the excess thickness region 198 of the overcoating 194 of solid thermoplastic material by locally contacting the excess thickness region 198 with a heated surface (i.e., a side wall of the heated substrate forming the reservoir). Such local contact caused the overcoating 194 in the excess thickness region 198 to reflow, thereby depositing a portion of the overcoating 194 on the heated surface of the substrate, and forming a reduced thickness region 198' as shown in FIG. 22A. FIG. 22B is a color inverted reproduction of the image shown in FIG. 22A, provided to enhance visibility of certain features.

Figure 23A:
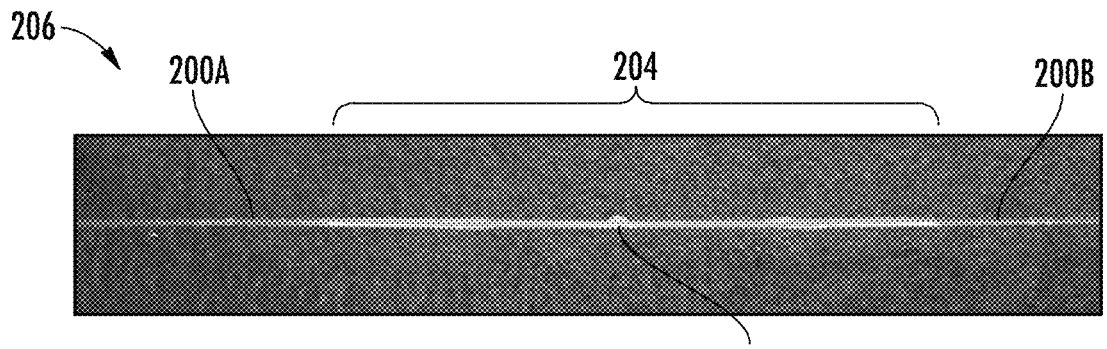
FIG. 23A is a photographic image of another fusion spliced section of optical fibers with an overcoating of the solid thermoplastic material applied by dip coating of the fusion spliced section in a pool of molten thermoplastic material, providing a nominal diameter of about 0.49 mm, and including an enhanced thickness region of thermoplastic material over a splice joint.
Figure 23B:
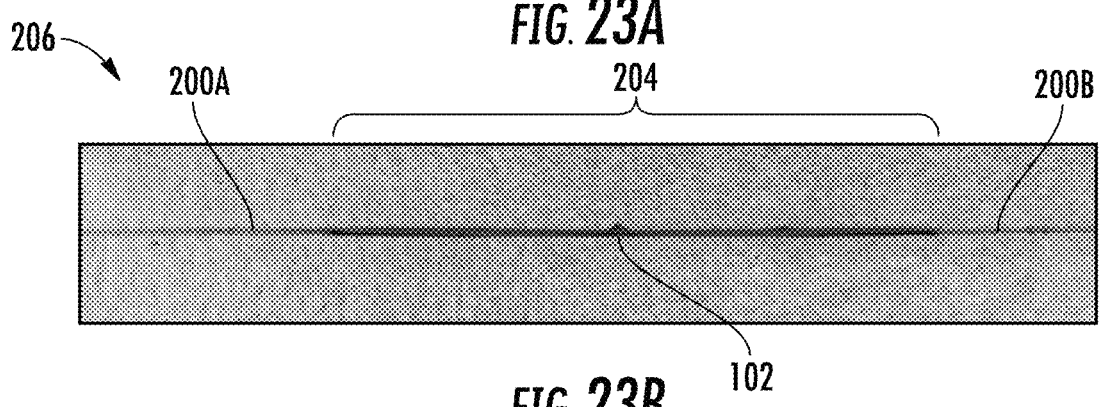
FIG. 23B is a color inverted reproduction of the image shown in FIG. 23A.

As a variant of the foregoing dip coating method of this Example, a similarly prepared fusion spliced segment was overcoated with TECHNOMELT® Supra 400 Cool thermoplastic material according to substantially the same conditions, but was modified with a non-uniform rate of withdrawal of the fusion spliced segment from the pool of molten thermoplastic material to yield an increased thickness overcoating at the center of the bare glass fiber region proximate to the splice joint. In particular, a thicker coating of thermoplastic material at the center of the splice joint was created by lifting both fiber ends simultaneously, and increasing the lifting speed when the fusion spliced segment was about to leave the upper surface of the pool of molten thermoplastic material. FIG. 23A is a photographic image of the resulting fusion spliced section 206 of optical fibers 200A, 200B with an overcoating of solid thermoplastic material 204 having a nominal diameter of about 0.49 mm, and including an enhanced thickness region 202 of thermoplastic material over the splice joint. FIG. 23B is a color inverted reproduction of the image shown in FIG. 23A, provided to enhance visibility of certain features.

Example 2

In a manner similar to Example 1, segments of two 900 μm buffered optical fibers were prepared for fusion splicing by stripping coating layers along ends thereof, and thereby exposing 250 μm coated sections and bare glass sections at the ends of the optical fibers, using mechanical stripping methods for the 900 μm buffer layer and a non-contact stripping method according to the '626 Patent for the 250 μm coating layers. Stripped ends of the two segments were fusion spliced together utilizing a conventional method to form a fusion spliced segment. The fusion spliced segment was then subject to overcoating with TECHNOMELT® PA 6208 polyamide-based material (Henkel Corp., Dusseldorf, Germany) which is a high performance thermoplastic material developed for low pressure molding (LPM) applications. The thermoplastic material has a softening point of 155° C., remains flexible down to −40° C., has a working temperature of up to 100° C., and exhibits a melt viscosity at 210° C. in a range of 2800 to 4000 cps. The thermoplastic material also bonds very well to both fiber coating materials and glass, and is thermally stable without producing fumes or volatile organic compounds at the selected process temperature (i.e., 210° C.). An apparatus having the same configuration as described in Example 1 was used to generate a pool of molten TECHNOMELT® PA 6208 polyamide material at a temperature of 210° C. A central portion of the fusion spliced segment (including the entire bare glass fiber region as well as short lengths of coated fiber proximate to the bare glass fiber region) was allowed to bow downward into the molten thermoplastic material so that the bare glass fiber region was completely immersed therein. The length of the bare glass fiber region was about 15 mm. Following such immersion, the fusion spliced segment was withdrawn upward from the pool of molten thermoplastic material at an approximately uniform rate, and the molten thermoplastic material cooled rapidly (e.g., within a few seconds) to form a solid thermoplastic overcoating over the previously immersed portion of the fusion spliced segment.

Figure 24A:
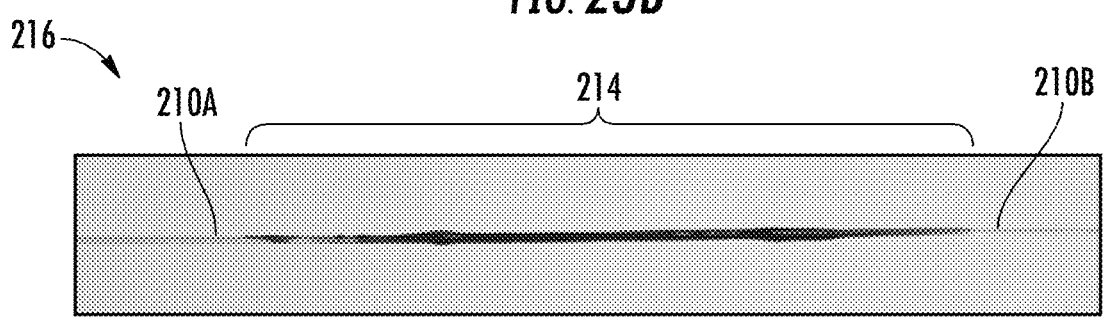
FIG. 24A is a photographic image of a fusion spliced section of optical fibers with an overcoating of a second solid thermoplastic material (TECHNOMELT® PA 6208 polyamide material, Henkel Corp., Dusseldorf, Germany) applied by dip coating of the fusion spliced section in a pool of molten thermoplastic material.
Figure 24B:
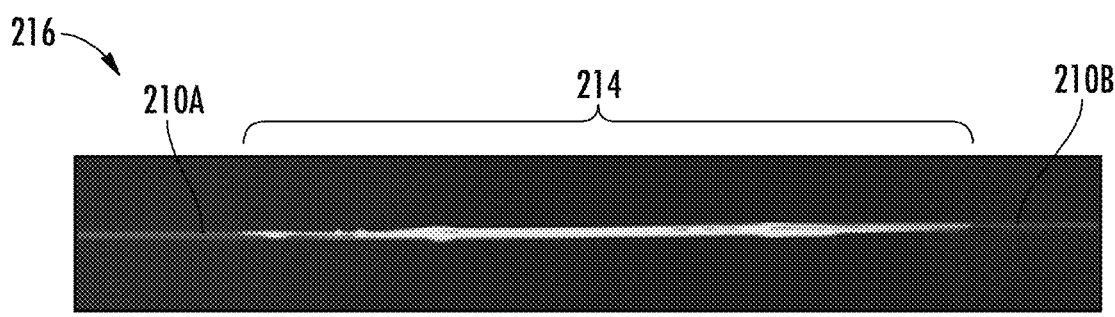
FIG. 24B is a color inverted reproduction of the image shown in FIG. 24A.
Figure 25A:
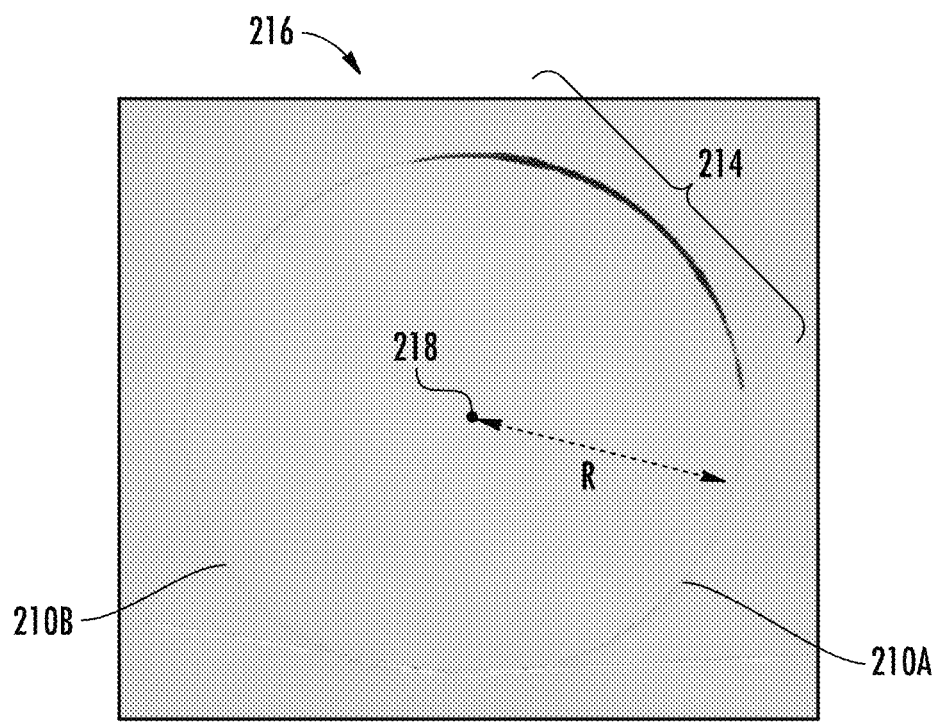
FIG. 25A is a photographic image of the overcoated fusion spliced section of optical fibers of FIG. 24A following natural coiling of the spliced fibers into a coil having a diameter of 40 mm.
Figure 25B:
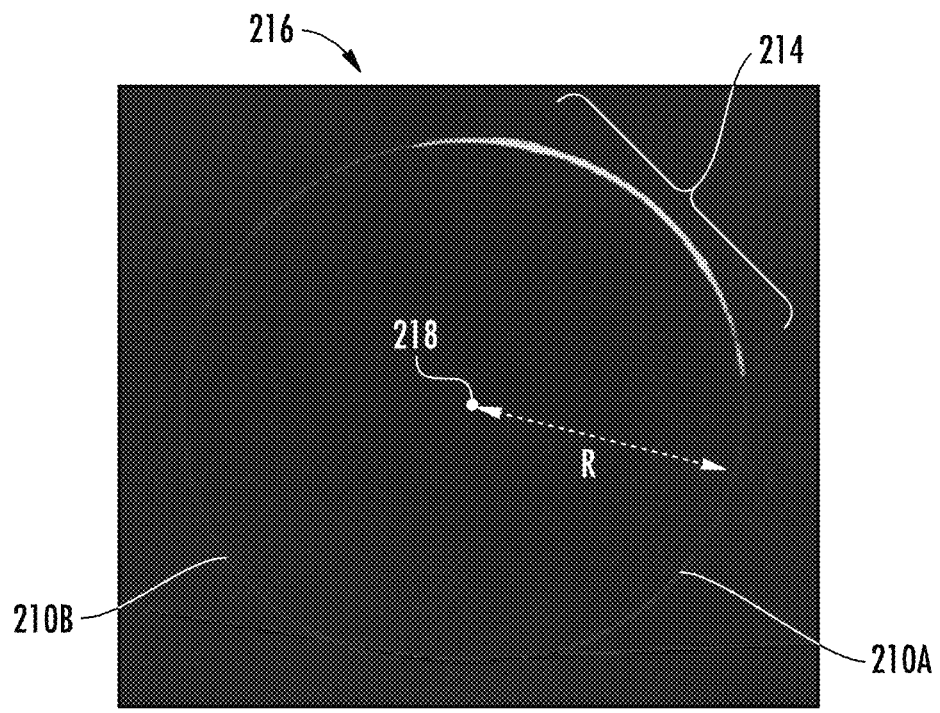
FIG. 25B is a color inverted reproduction of the image shown in FIG. 25A.

FIG. 24A is a photographic image of the fusion spliced section 216 of optical fibers 210A, 210B with an overcoating 214 of solid thermoplastic material (TECHNOMELT® PA 6208 polyamide material) having a diameter of about 0.49 mm obtained by the foregoing method. FIG. 24B is a color inverted reproduction of the image shown in FIG. 24A, provided to enhance visibility of certain features. The overcoated fusion spliced section 216 incorporating the overcoating 214 of solid thermoplastic material was flexible. Such flexibility is demonstrated by FIG. 25A, which is a photographic image of the overcoated fusion spliced section 216 of FIG. 24A following natural coiling of the spliced fibers into a coil having a diameter of 40 mm. Due to poor visibility of the optical fibers 210A, 210B in the coiled configuration, a center point 218 and radius R of the coil have been added to FIG. 25A. FIG. 25B is a color inverted reproduction of the image shown in FIG. 25A, provided to enhance visibility of certain features.

It has been confirmed by experimental tests that a solid thermoplastic overcoating formed by methods disclosed herein does not introduce measureable insertion loss, even when manipulated into a bend radius of 20 mm, with such radius being comparable to typical bend radii experienced by optical fibers within fiber optic components such as modules.

Figure 26:
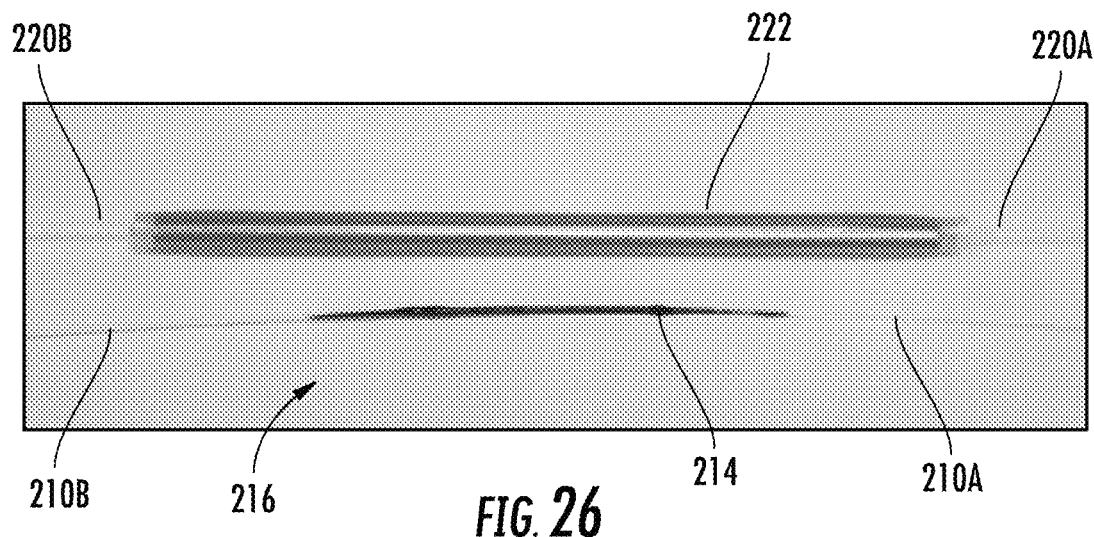
FIG. 26 is a photographic image of a conventional length heat shrink protected fusion spliced section of optical fibers (top) arranged side-by-side with the polyamide overcoated fusion spliced section of optical fibers of FIG. 24A (bottom).

FIG. 26 is a photographic image of a conventional 40 mm length heat shrink protected fusion spliced section 222 of optical fibers 220A, 220B (top) arranged side-by-side with the polyamide overcoated fusion spliced section 216 of optical fibers 210A, 210B with an overcoating 214 of solid polyamide material according to FIG. 24A (bottom). As shown in FIG. 26, the length and outer diameter dimensions of the overcoated fusion spliced section 216 is dramatically smaller than the corresponding dimensions of the heat shrink protected fusion spliced section 222 of optical fibers 220A, 220B. Since the heat shrink protection fusion spliced section 222 is rigid in character, its bend radius is necessarily much larger than that of the overcoated fusion spliced section 216.

Figure 27:
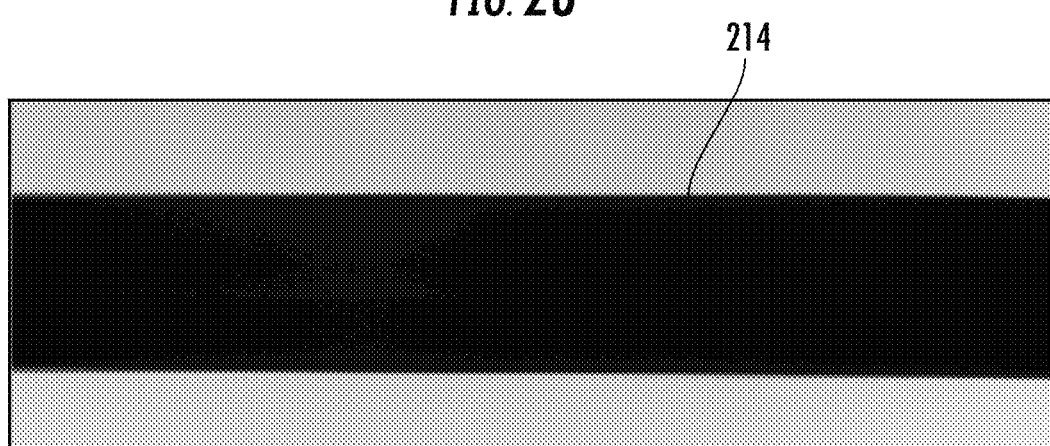
FIG. 27 is a 5× microscope image of a center portion of the polyamide overcoated fusion spliced section of optical fibers of FIG. 24A, showing a substantial uniform overcoat diameter of about 0.49 mm.
Figure 28:
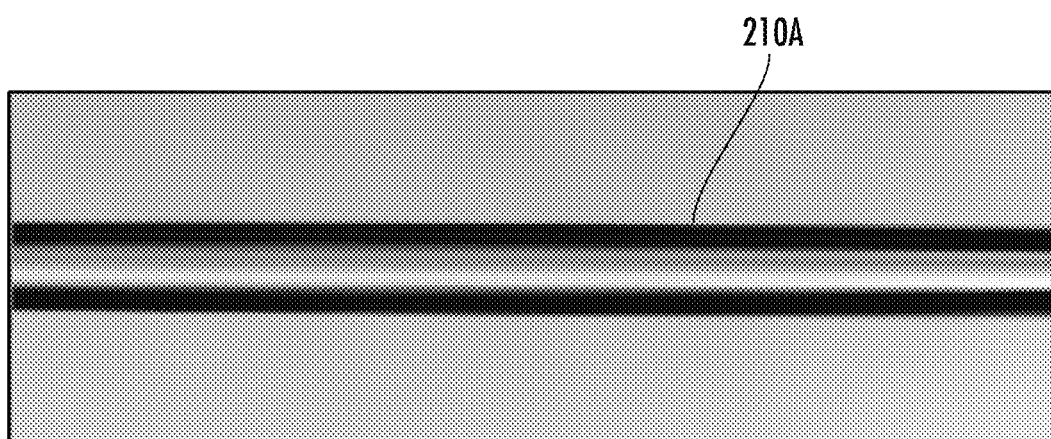
FIG. 28 is a microscope image of a pre-coated section of a conventional optical fiber without an overcoating layer, to permit comparison with the image of FIG. 27.

FIG. 27 is a 5× microscope image of a center portion of the polyamide overcoated fusion spliced section 216 of optical fibers 210A, 210B of FIG. 24A, showing the overcoating 214 having a substantially uniform diameter of about 0.49 mm, without significant diametric variation in the visible frame. FIG. 28 is a microscope image of a pre-coated section of a conventional optical fiber 210A without an overcoating layer, to permit comparison with the image of FIG. 27. FIG. 27 suggests that solid thermoplastic overcoatings as described herein may be used to generate fiber optic cable assemblies with relatively small variation in external diameter over at least certain portions of their length.

Example 3

Figure 29:
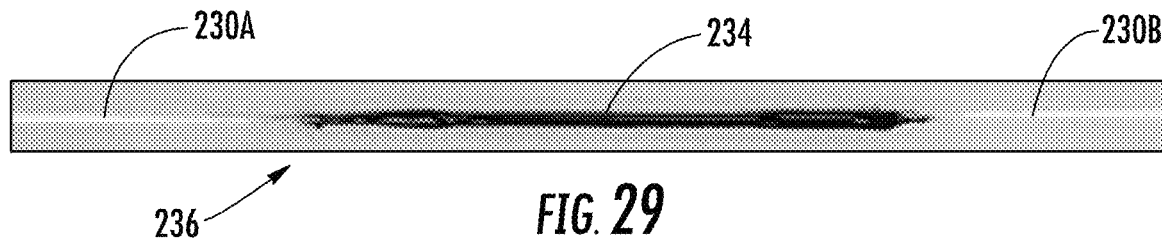
FIG. 29 is a photographic image of a fusion spliced section of single optical fibers, with a polyamide overcoating over the fusion spliced section.

FIG. 29 is a photographic image of a fusion spliced section 236 of single optical fibers 230A, 230B, with a polyamide overcoating 234 over the fusion spliced section 236. TECHNOMELT® PA 678 thermoplastic polyamide material (Henkel Corp., Dusseldorf, Germany), having a melt temperature of about 210° C. and a softening temperature of 185° C., was used as the melt flow thermoplastic material. A heated surface having a length of 20 mm was used. A thermoplastic pellet of the foregoing material was heated to the operation temperature of 210° C., in which the viscosity of the thermoplastic material was reduced to about 3000 cps. The thermoplastic material flowed to cover the heated surface uniformly and stopped at the edges to form a curved upper surface. The spliced fiber with a total strip length of 10 mm was aligned to the center of the molten thermoplastic material, and thereafter was fully immersed into the molten thermoplastic pool. The thermoplastic (polyamide) overcoating 234 extended past the stripped optical fiber sections by 5 mm in each direction to overlap the pre-coated sections of the optical fibers 230A, 230B.

Example 4

Figure 30:
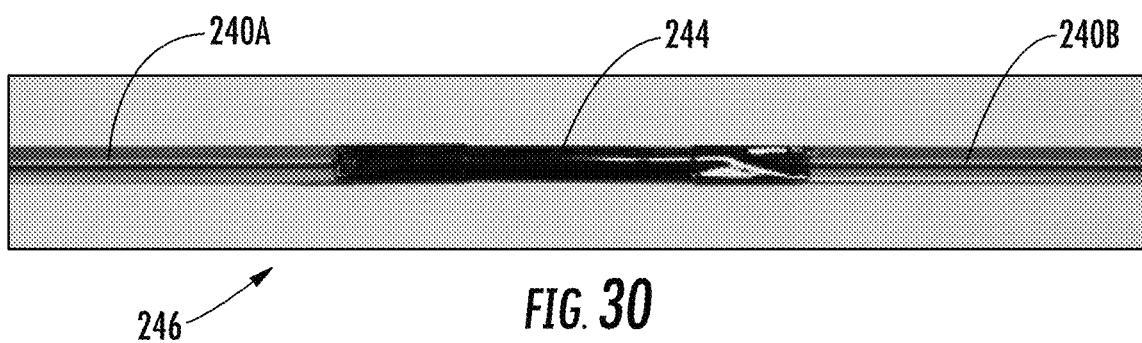
FIG. 30 is a photographic image of an optical fiber ribbon splice between two optical fiber ribbons, with a polyamide overcoating over the optical fiber ribbon splice.

FIG. 30 is a photographic image of an optical fiber ribbon splice 246 between two optical fiber ribbons 240A, 240B, with a polyamide overcoating 244 over the ribbon splice. Two twelve-fiber ribbons 240A, 240B were fusion spliced together using a Sumitomo ribbon fusion splicer. The total strip length was 20 mm. The fusion spliced ribbon was coated using TECHNOMELT® PA 678 thermoplastic polyamide material using the same parameters outlined in Example 3, except a heated surface having a length of 40 mm was used. Referring to FIG. 30, the coated region has a comparable size as the rest of the ribbon. The flexibility of the optical fiber ribbon splice 246 can be controlled by the thickness of the thermoplastic coating material.

Example 5

Figure 31A:
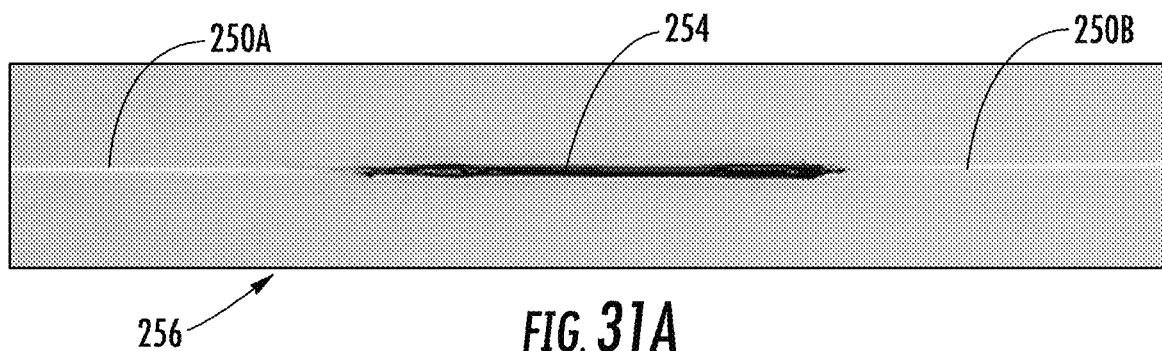
FIG. 31A is a photographic image of a fusion spliced section of optical fibers with an overcoating of solid thermoplastic material, prior to adhesion of a solid strength member.

250 μm coated optical fibers were striped, cleaned, and cleaved with a strip length of 5 mm. Two optical fibers 250A, 250B were fusion spliced using an America Fujikura Ltd. (AFL) 70S fusion splicer. The spliced optical fibers 250A, 250B were pre-coated in a molten bath of TECHNOMELT® PA 6208 polyamide thermoplastic material (Henkel Corp., Dusseldorf, Germany) to form a thermoplastic overcoating 254 with a total length of 20 mm, as depicted in FIG. 31A. The diameter of the thermoplastic overcoating 254 was about 0.3 mm at the splice region, and 0.5 mm near the stripped coating edges, with the thermoplastic overcoating 254 provided along a central portion of the fusion spliced section 256.

Figure 31B:
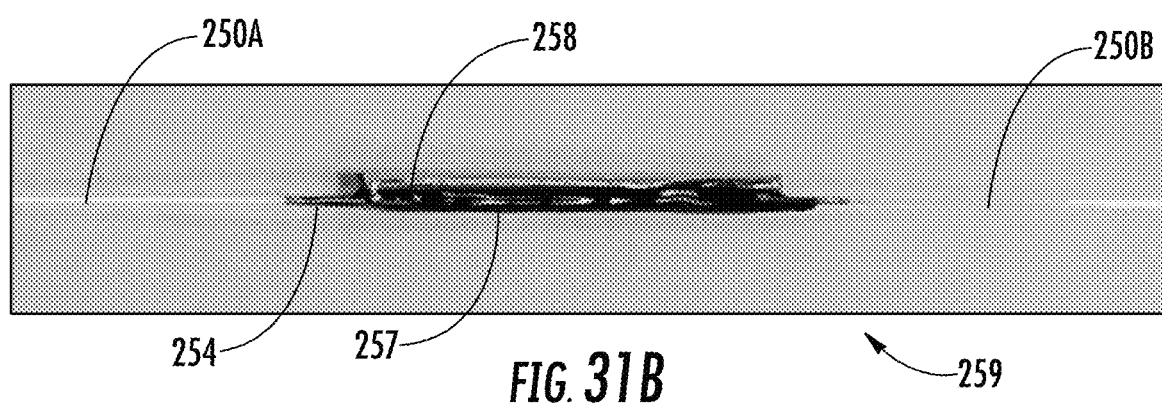
FIG. 31B is a photographic image of the fusion spliced section of FIG. 31A following joining of a stainless steel strength member to the fusion spliced section using a thermoplastic adhesive material to yield a reinforced fusion spliced section.

Referring to FIG. 31B, a stainless steel rod 258 with a diameter of 0.68 mm and a length of about 15 mm was used as a strength member 258. The same TECHNOMELT® PA 6208 polyamide thermoplastic material was used for bonding the stainless steel rod 258 to the overcoated fusion spliced region. The stainless steel rod 258 and the polyamide thermoplastic material were heated to a temperature of 205° C. Following the method described above, the pre-coated spliced optical fibers 250A, 250B was held straight to rapidly swipe the stainless steel rod 258 along with a portion of the molten thermoplastic adhesive away from the heated surface. The stainless steel rod 258 was adhered along one external portion of the previously overcoated fusion spliced region 256, without requiring presence of any sleeve for attachment of the stainless steel rod 258. FIG. 31B is a photographic image of the finished reinforced splice, showing the stainless steel rod 258 adhered with thermoplastic adhesive material 257 to an exterior portion of the thermoplastic overcoating 254 to form a reinforced fusion spliced section 259 of the optical fibers 250A, 250B.

Unlike conventional heat shrink protection sleeves, the thermoplastic adhesive material can partially cover the surface of the strength member and provide sufficient bonding force. In certain embodiments, the strength member can also be pre-coated (e.g., around a portion or an entirety of a perimeter thereof) with thermoplastic adhesive material prior to the swipe bonding process.

Figure 32:
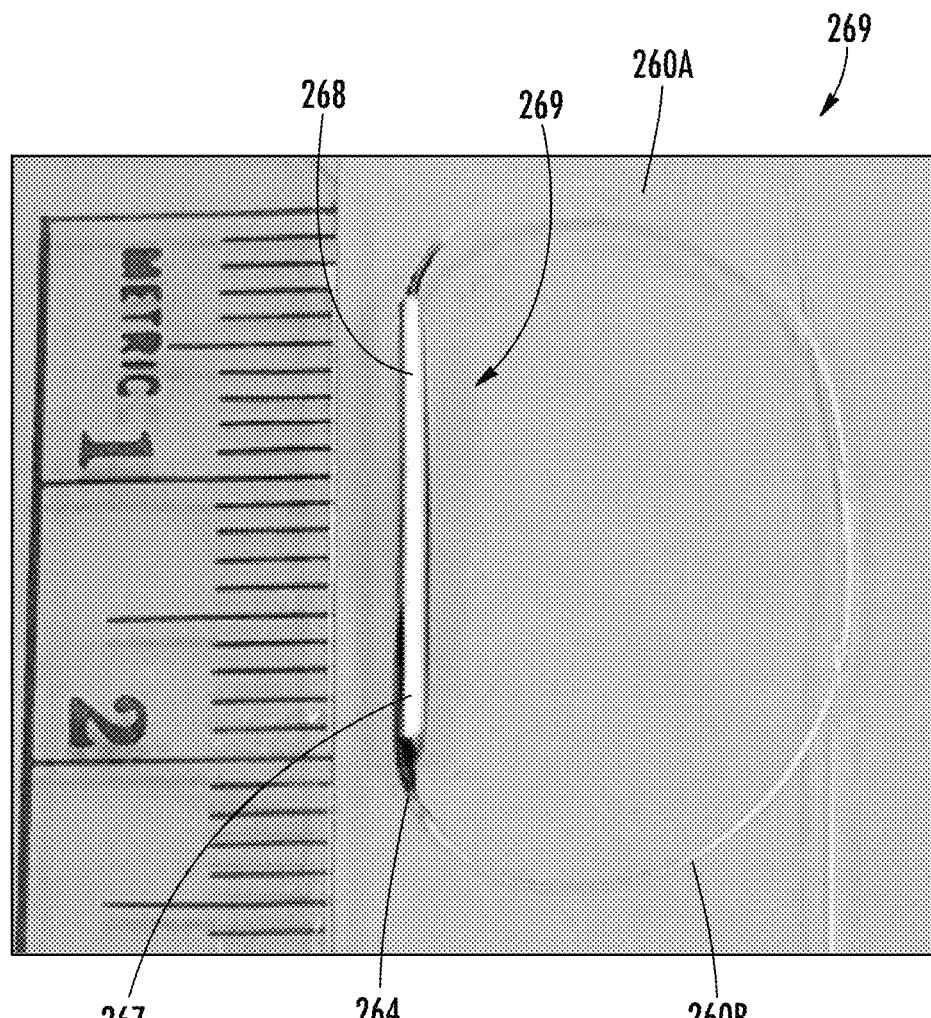
FIG. 32 is a photographic image of a reinforced fusion spliced section of optical fibers including an overcoating of solid thermoplastic material and a stainless steel strength member adhered thereto, following coiling of reinforced fusion spliced section into a tight bend having a maximum a diameter of less than 25 mm.

A reinforced fusion spliced section can be coiled into a very small space without concerning about the reliability of a splice region that is kept straight by a stainless steel rod. The TECHNOMELT® PA 6208 polyamide thermoplastic material exhibits strong adhesion to stainless steel. The thermoplastic material at the ends of the rod serves as strain reliever for the coated optical fibers. Optical fiber outside the stripped region can be bent to a radius as small as 5 mm and still maintaining a service life of 20 years. FIG. 32 shows a reinforced fusion spliced section 269 of optical fibers 260A, 260B with a stainless steel rod 268 affixed by thermoplastic adhesive 267 to an exterior portion of a thermoplastic overcoating 264 arranged over a fusion spliced region. FIG. 32 shows that the optical fibers 260A, 260B incorporating the reinforced fusion spliced section 269 can be coiled to a space less than 2.5 cm in diameter. This is advantageous for making compact components or cable assemblies, such as a Corning OptiSheath® MultiPort Flex Terminal.

Example 6

Figure 33A:
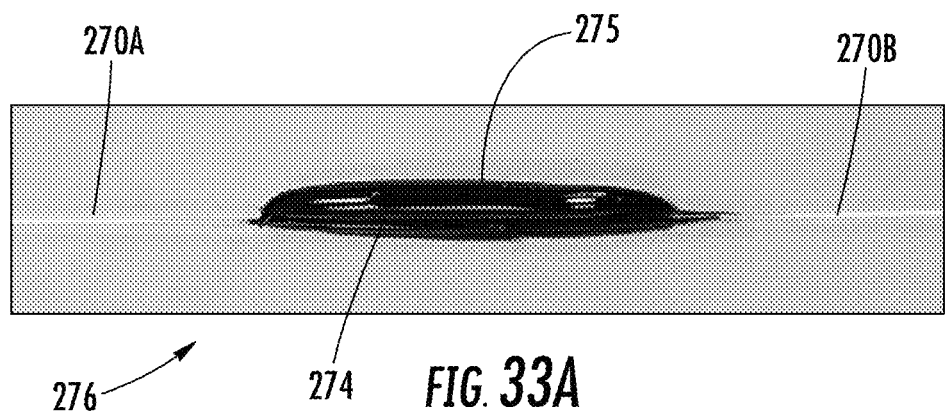
FIG. 33A is a photographic image of a reinforced fusion spliced section of optical fibers including a first overcoating of solid thermoplastic material and including a second, thicker overcoating of solid thermoplastic material to provide reinforcement for the spliced section.
Figure 33B:
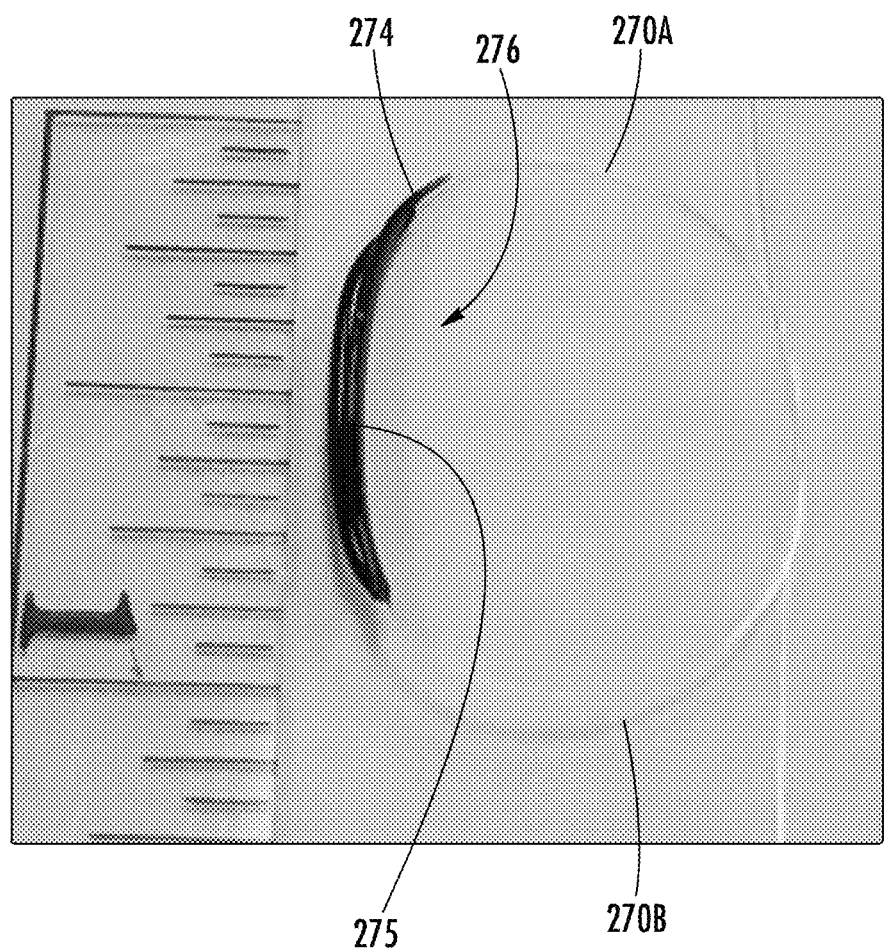
FIG. 33B is a photographic image of the fusion spliced section of FIG. 33A coiled to a diameter of one inch (2.54 cm), with the splice region remaining relatively straight.

FIG. 33A shows an alternative reinforcement method utilizing a thick secondary layer 275 of thermoplastic adhesive material without use of a solid strength member such as a stainless steel rod. The same thermoplastic material used for thermoplastically overcoating the fusion spliced region was used for formation of the thick secondary layer 275. A large amount of molten thermoplastic material (to form the thick secondary layer) was swiped away from a heated surface using a previously thermoplastically overcoated fusion spliced section of optical fibers 270A, 270B. The molten thermoplastic material was rapidly cooled and solidified to form the thick secondary layer 275 serving to stiffen the splice region already bearing a thinner thermoplastic overcoating 274. The diameter of the secondary layer or reinforced region can be from 1 mm to 3 mm. FIG. 33B shows the reinforced fusion spliced section 276 coiled to a diameter of one inch (2.54 cm), with the splice region remaining relatively straight.

The sleeveless splice overcoat and reinforcing processes are distinctly different from conventional heat shrink sleeves. The sleeveless process does not require threading a component over the fiber before fusion splicing. It also does not require sliding the sleeve over the splice region after fusion splicing. The sleeveless process uses simple materials such as thermoplastic adhesive and stainless steel rods, resulting in significant cost savings compared to heat shrink sleeves. Furthermore, the process cycle time is faster.

A salient feature of the sleeveless reinforced splice assembly is that the strength member can be removed by reheating the splice region, without damaging the fiber splice. Whereas the heat shrink protection sleeve irreversibly bonds the spliced fiber to the strength rod, it does not allow the flexibility to reconfigure the type of splice reinforcement.

It will be apparent to those skilled in the art that various modifications to the preferred embodiments of the disclosure as described herein can be made. For example, in certain embodiments, removal of a fusion spliced segment from a pool of molten thermoplastic material may be effectuated by moving the pool (e.g., downward) away from the fusion spliced segment, rather than by exclusive movement of the fusion spliced segment. Other thermoplastic materials fulfilling the functional criteria may be substituted for the specific overcoating materials disclosed herein.

Those skilled in the art will appreciate that other modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred.

What is claimed is:

1. A fiber optic cable assembly comprising:
   first and second optical fibers each including a pre-coated section and a stripped section;
   a fusion splice including a splice joint joining ends of the stripped sections of the first and second optical fibers;
   a solid thermoplastic overcoating extending over the stripped section of each of the first and the second optical fibers, the splice joint, and at least a portion of the pre-coated section of each of the first and the second optical fibers;
   wherein the solid thermoplastic overcoating comprises a polyamide material; and
   a strength member adhered to the solid thermoplastic overcoating, wherein the strength member comprises a length that exceeds a combined length of the stripped sections of the first and second optical fibers, and the strength member spans across the splice joint; and
   the fiber optic cable assembly being devoid of a heat shrink tube arranged over the splice joint.

2. The fiber optic cable assembly of claim 1, wherein the solid thermoplastic overcoating comprises a length, and comprises a diameter that varies over at least a portion of the length.

3. The fiber optic cable assembly of claim 1, wherein the solid thermoplastic overcoating comprises a first average outer diameter over the at least a portion of the pre-coated section of each of the first and the second optical fibers, the solid thermoplastic overcoating comprises a second average outer diameter over the stripped section of each of the first and the second optical fibers, and the first average outer diameter exceeds the second average outer diameter.

4. The fiber optic cable assembly of claim 1, wherein the solid thermoplastic overcoating is devoid of a UV curable material.

5. The fiber optic cable assembly of claim 1, wherein the solid thermoplastic overcoating is devoid of inorganic filler particles.

6. The fiber optic cable assembly of claim 1, wherein at least a portion of the solid thermoplastic overcoating includes an outer diameter that exceeds an outer diameter of the pre-coated sections of each of the first and the second optical fibers.

7. The fiber optic cable assembly of claim 1, wherein the strength member comprises a metal rod.

8. The fiber optic cable assembly of claim 1, further comprising additional solid thermoplastic material in contact with at least a portion of the solid thermoplastic overcoating, wherein the strength member is adhered to the solid thermoplastic overcoating with the additional solid thermoplastic material.

9. The fiber optic cable assembly of claim 8, wherein the additional solid thermoplastic material extends around less than an entire perimeter of the strength member in a direction transverse to the longitudinal direction.

10. The fiber optic cable assembly of claim 8, wherein the additional solid thermoplastic material comprises a melt viscosity in a range of about 100 cps to about 10,000 cps.

11. The fiber optic cable assembly of claim 8, wherein the additional solid thermoplastic material spans across the splice joint, and comprises a center of mass that is laterally offset relative to the stripped sections of the first and second optical fibers.

12. The fiber optic cable assembly of claim 8, wherein the additional solid thermoplastic material comprises a length exceeding a combined length of the stripped sections of the first and second optical fibers.

13. The fiber optic cable assembly of claim 8, wherein the additional solid thermoplastic material is at least partially compositionally different from the solid thermoplastic overcoating.

14. The fiber optic cable assembly of claim 8, wherein the additional solid thermoplastic material is compositionally the same as the solid thermoplastic overcoating.

15. The fiber optic cable assembly of claim 1, wherein:
   the first optical fiber is part of a first fiber optic cable section that comprises a first plurality of optical fibers;
   the second optical fiber is part of a second fiber optic cable section that comprises a second plurality of optical fibers;
   each optical fiber of the first and second pluralities of optical fibers includes a pre-coated section and a stripped section;
   the fusion splice is part of a plurality of fusion splices that includes a plurality of splice joints joining ends of the stripped sections of the first plurality of optical fibers with ends of the stripped sections of the second plurality of optical fibers;
   the solid thermoplastic overcoating extends over the stripped sections of the first and the second pluralities of optical fibers, the plurality of splice joints, and at least a portion of the precoated sections of the first and the second pluralities of optical fibers; and each stripped section of the first plurality of optical fibers is substantially parallel, and each stripped section of the second plurality of optical fibers is substantially parallel.

16. The fiber optic cable assembly of claim 15, wherein the first plurality of optical fibers is embodied in a first ribbon cable segment, and the second plurality of optical fibers is embodied in a second ribbon cable segment.

17. The fiber optic cable assembly of claim 16, wherein:
the first ribbon cable segment includes a first section of ribbonizing material covering at least part of the first plurality of optical fibers;
the second ribbon cable segment includes a second section of ribbonizing material covering at least part of the first plurality of optical fibers; and
the solid thermoplastic overcoating further extends over portions of the first section of ribbonizing material and the second section of ribbonizing material.

18. The fiber optic cable assembly of claim 17, wherein the solid thermoplastic overcoating comprises a melt temperature that is below a melt temperature of coating material of the pre-coated sections of the first and second pluralities of optical fibers.

19. The fiber optic cable assembly of claim 17, wherein the solid thermoplastic overcoating comprises a height and a width, and at least one of the height or the width varies over at least a portion of a length of the solid thermoplastic overcoating.

20. The fiber optic cable assembly of claim 17, wherein the solid thermoplastic overcoating comprises a first average height over the at least a portion of the precoated section of each of the first and the second pluralities of optical fibers, the solid thermoplastic overcoating comprises a second average height over the stripped section of each of the first and the second pluralities of optical fibers, and the first average height exceeds the second average height.

21. The fiber optic cable assembly of claim 17, wherein at least a portion of the solid thermoplastic overcoating includes a height that exceeds a height of the pre-coated sections of each of the first and the second pluralities of optical fibers.

22. A fiber optic cable assembly comprising:
first and second optical fibers each including a pre-coated section and a stripped section;
a fusion splice including a splice joint joining ends of the stripped sections of the first and second optical fibers;
a solid thermoplastic overcoating extending over the stripped section of each of the first and the second optical fibers, the splice joint, and at least a portion of the pre-coated section of each of the first and the second optical fibers;
wherein the solid thermoplastic overcoating comprises a polyamide material; and a strength member adhered to the solid thermoplastic overcoating, wherein the strength member comprises a length that exceeds a combined length of the stripped sections of the first and second optical fibers, and the strength member spans across the splice joint; and
wherein the solid thermoplastic overcoating comprises a first average outer diameter over the at least a portion of the pre-coated section of each of the first and the second optical fibers, the solid thermoplastic overcoating comprises a second average outer diameter over the stripped section of each of the first and the second optical fibers, and the first average outer diameter exceeds the second average outer diameter.

23. A fiber optic cable assembly comprising:
first and second optical fibers each including a pre-coated section and a stripped section;
a fusion splice including a splice joint joining ends of the stripped sections of the first and second optical fibers;
a solid thermoplastic overcoating extending over the stripped section of each of the first and the second optical fibers, the splice joint, and at least a portion of the pre-coated section of each of the first and the second optical fibers;
wherein the solid thermoplastic overcoating comprises a polyamide material; and a strength member adhered to the solid thermoplastic overcoating, wherein the strength member comprises a length that exceeds a combined length of the stripped sections of the first and second optical fibers, and the strength member spans across the splice joint;
and wherein:
the first optical fiber is part of a first fiber optic cable section that comprises a first plurality of optical fibers;
the second optical fiber is part of a second fiber optic cable section that comprises a second plurality of optical fibers;
each optical fiber of the first and second pluralities of optical fibers includes a pre-coated section and a stripped section;
the fusion splice is part of a plurality of fusion splices that includes a plurality of splice joints joining ends of the stripped sections of the first plurality of optical fibers with ends of the stripped sections of the second plurality of optical fibers;
the solid thermoplastic overcoating extends over the stripped sections of the first and the second pluralities of optical fibers, the plurality of splice joints, and at least a portion of the precoated sections of the first and the second pluralities of optical fibers; and
each stripped section of the first plurality of optical fibers is substantially parallel, and each stripped section of the second plurality of optical fibers is substantially parallel.

* * * * *

UNITED STATES PATENT AND TRADEMARK OFFICE
CERTIFICATE OF CORRECTION

| | |
|---|---|
| PATENT NO. | : 11,131,811 B2 |
| APPLICATION NO. | : 16/573116 |
| DATED | : September 28, 2021 |
| INVENTOR(S) | : Qi Wu |

It is certified that error appears in the above-identified patent and that said Letters Patent is hereby corrected as shown below:

On the Title Page

In Column 2, item (56), Other Publications, Line 1, delete "CO2" and insert -- $CO_2$ --, therefor.

On page 2, in Column 2, item (56), Other Publications, Line 27, delete "Usion" and insert -- Fusion --, therefor.

In the Claims

In Column 34, Claim 15, Line 18, delete "precoated" and insert -- pre-coated --, therefor.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*